United States Patent
Shigemura

(10) Patent No.: US 10,354,160 B2
(45) Date of Patent: Jul. 16, 2019

(54) PEDESTRIAN DETECTION DEVICE AND PEDESTRIAN DETECTION METHOD

(71) Applicant: DENSO CORPORATION, Kariya, Aichi-pref. (JP)

(72) Inventor: Shusaku Shigemura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 108 days.

(21) Appl. No.: 15/327,607

(22) PCT Filed: Jun. 29, 2015

(86) PCT No.: PCT/JP2015/003258
§ 371 (c)(1),
(2) Date: Jan. 19, 2017

(87) PCT Pub. No.: WO2016/013159
PCT Pub. Date: Jan. 28, 2016

(65) Prior Publication Data
US 2018/0144207 A1 May 24, 2018

(30) Foreign Application Priority Data

Jul. 25, 2014 (JP) .................................. 2014-152426

(51) Int. Cl.
*G06K 9/00* (2006.01)
*G06K 9/32* (2006.01)
(Continued)

(52) U.S. Cl.
CPC .......... *G06K 9/3241* (2013.01); *G01S 13/862* (2013.01); *G01S 13/867* (2013.01);
(Continued)

(58) Field of Classification Search
None
See application file for complete search history.

(56) References Cited

U.S. PATENT DOCUMENTS 7,227,893 B1 * 6/2007 Srinivasa ........... G06K 9/00771
348/155
7,418,112 B2 * 8/2008 Ogasawara ........ G06K 9/00369
348/143

(Continued)

FOREIGN PATENT DOCUMENTS

JP 2012-220377 A 11/2011

OTHER PUBLICATIONS

Navneet Dalal and Bill Triggs, Histograms of Oriented Gradients for Human Detection, Proceedings of the 2005 IEEE Computer Society Conference on Computer Vision and Pattern Recognition, in 8 pages.

*Primary Examiner* — Samah A Beg
(74) *Attorney, Agent, or Firm* — Knobbe, Martens, Olson & Bear, LLP

(57) ABSTRACT

A pedestrian detection device on a vehicle having a vehicular camera and a sonar or a radar includes: an identification dictionary storage unit that stores multiple identification dictionaries of shape features of a pedestrian; a detection result accumulation unit that searches the captured image for one feature to detect the pedestrian, and accumulates a detection result for each identification dictionary; a pedestrian position accumulation unit that detects the pedestrian using the sonar or the radar, and accumulates a pedestrian position; an identification dictionary selection unit that selects a detection identification dictionary having the detection result consistent with the pedestrian position; and a pedestrian detection unit that searches the captured image for one feature described in the detection identification dictionary, and detects the pedestrian.

8 Claims, 22 Drawing Sheets

(51) Int. Cl.
*G01S 15/93* (2006.01)
*G01S 15/87* (2006.01)
*G01S 13/86* (2006.01)
*G01S 13/93* (2006.01)
*G06K 9/68* (2006.01)
*G08G 1/16* (2006.01)
*G06K 9/62* (2006.01)
*H04N 7/18* (2006.01)
*G01S 15/02* (2006.01)
*G01S 13/72* (2006.01)
*G01S 15/66* (2006.01)

(52) U.S. Cl.
CPC .......... *G01S 13/931* (2013.01); *G01S 15/025* (2013.01); *G01S 15/87* (2013.01); *G01S 15/93* (2013.01); *G01S 15/931* (2013.01); *G06K 9/00362* (2013.01); *G06K 9/00791* (2013.01); *G06K 9/6255* (2013.01); *G06K 9/6807* (2013.01); *G08G 1/166* (2013.01); *H04N 7/183* (2013.01); *G01S 13/723* (2013.01); *G01S 15/66* (2013.01); *G01S 2013/9364* (2013.01); *G01S 2013/9375* (2013.01); *G01S 2013/9389* (2013.01)

(56) References Cited

U.S. PATENT DOCUMENTS

| | | | | |
|---|---|---|---|---|
| 7,853,072 | B2* | 12/2010 | Han | G06K 9/4642 382/103 |
| 8,787,629 | B2* | 7/2014 | Kaneda | G06K 9/00604 382/103 |
| 9,336,436 | B1* | 5/2016 | Dowdall | G08G 1/166 |
| 9,704,061 | B2* | 7/2017 | Chiaki | G06K 9/52 |
| 9,721,172 | B2* | 8/2017 | Wright | G06K 9/00825 |
| 9,809,227 | B2* | 11/2017 | Kojima | B60W 40/02 |
| 9,824,449 | B2* | 11/2017 | Iwasaki | G06K 9/00362 |
| 9,852,334 | B2* | 12/2017 | Goto | G06K 9/00369 |
| 9,963,128 | B2* | 5/2018 | Tochigi | B60T 7/22 |
| 9,994,148 | B1* | 6/2018 | Kim | B60Q 5/006 |
| 2004/0155811 | A1* | 8/2004 | Albero | B60K 31/0008 342/70 |
| 2004/0234136 | A1* | 11/2004 | Zhu | G06K 9/3241 382/224 |
| 2005/0280657 | A1* | 12/2005 | Hori | G06T 7/246 345/619 |
| 2010/0226532 | A1* | 9/2010 | Hayasaka | G06K 9/6203 382/103 |
| 2011/0135159 | A1* | 6/2011 | Uchida | G06T 7/269 382/107 |
| 2012/0035846 | A1* | 2/2012 | Sakamoto | B60T 8/17558 701/301 |
| 2013/0094759 | A1* | 4/2013 | Yagi | G06K 9/00369 382/170 |
| 2014/0233795 | A1* | 8/2014 | Omino | G06K 9/00805 382/103 |
| 2014/0236386 | A1* | 8/2014 | Yoshizawa | B60W 30/08 701/1 |
| 2014/0270548 | A1* | 9/2014 | Kamiya | G06K 9/00536 382/224 |
| 2014/0321759 | A1* | 10/2014 | Kamiya | G06K 9/00993 382/217 |
| 2014/0333467 | A1* | 11/2014 | Inomata | G01S 13/867 342/27 |
| 2014/0348383 | A1* | 11/2014 | Kamiya | G06K 9/00362 382/103 |
| 2015/0049195 | A1* | 2/2015 | Ishigaki | G06K 9/00805 348/148 |
| 2015/0146919 | A1* | 5/2015 | Ryu | G06K 9/4642 382/103 |
| 2016/0019429 | A1* | 1/2016 | Ishigaki | G06T 7/73 348/47 |
| 2016/0349358 | A1* | 12/2016 | Noda | G01S 13/867 |
| 2017/0097412 | A1* | 4/2017 | Liu | G01S 13/58 |
| 2017/0151943 | A1* | 6/2017 | Goto | B60W 30/09 |
| 2017/0213094 | A1* | 7/2017 | Kamiya | G06K 9/00805 |
| 2017/0309178 | A1* | 10/2017 | Hernandez | G08G 1/163 |
| 2018/0068206 | A1* | 3/2018 | Pollach | G06K 9/00791 |
| 2018/0081181 | A1* | 3/2018 | Lambert | G02B 27/0189 |
| 2018/0114074 | A1* | 4/2018 | Baba | G06K 9/00805 |
| 2018/0118204 | A1* | 5/2018 | Ito | B60W 30/09 |
| 2018/0129217 | A1* | 5/2018 | Asada | G05D 1/0214 |

* cited by examiner

FIG. 3A
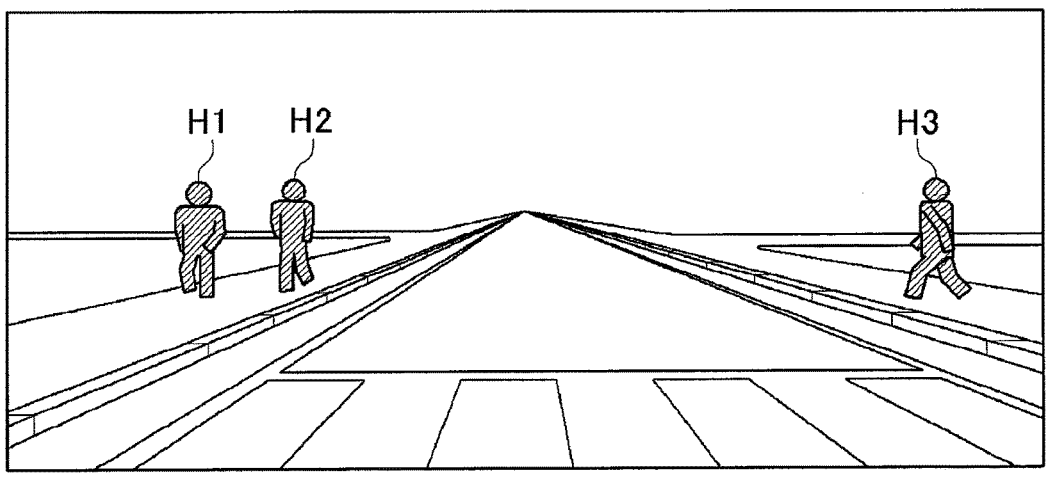
FIG. 3B    FIG. 3C    FIG. 3D
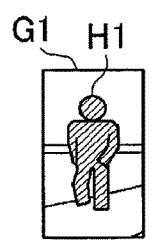 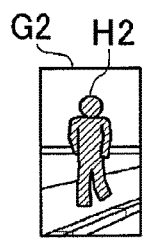 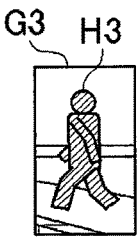
FIG. 3E
CONVERSION INTO NUMERICAL FORM
FIG. 3F

PEDESTRIAN DETECTION RESULT BY CAPTURED IMAGE

PEDESTRIAN DETECTION RESULT BY SONARS

PEDESTRIAN DETECTION DEVICE AND PEDESTRIAN DETECTION METHOD

CROSS REFERENCE TO RELATED APPLICATION

This application is based on Japanese Patent Application No. 2014-152426 filed on Jul. 25, 2014, the disclosure of which is incorporated herein by reference.

TECHNICAL FIELD

The present disclosure relates to a pedestrian detection device and a pedestrian detection method that analyze a captured image obtained by an vehicular camera to detect a pedestrian in the captured image.

BACKGROUND ART

In a vehicle of today, in order to ensure safe traveling or to support a driving operation of a driver, a condition around the vehicle is monitored using various techniques. As a representative one of these techniques, there is known a technique that analyzes a captured image obtained from an vehicular camera to detect a pedestrian in the captured image.

In the detection of a pedestrian in a captured image, a feature of the pedestrian to be detected is stored with mainly focusing on the outer shape of the pedestrian, and a search for an area having the feature of the pedestrian in the captured image is performed. When the area having the feature of the pedestrian is found, the area is determined to include the pedestrian (Patent Literature 1, for example).

However, the pedestrian is not solely included in the captured image. Thus, when the search for an area having the feature of the pedestrian is performed in the captured image, an area having the feature of the pedestrian as a whole is searched from an image that also includes the surroundings of the pedestrian.

Further, a condition around the pedestrian in the captured image varies according to environmental factors during image capturing. For example, when an image is captured in good weather, a shadow of the pedestrian is also included together with the pedestrian. Further, the length of the shadow and contrast with the background vary according to seasons or time of image capturing. Further, since clothes change according to seasons or areas, the outer shape itself of the pedestrian also changes.

Thus, in the search for a pedestrian in a captured image, when an area does not completely have the feature of the pedestrian, but roughly has the feature of the pedestrian, the area is determined to include the pedestrian.

However, in the above conventional technique, there is a limit in improving the pedestrian detection accuracy because of the following reason. In order to improve the pedestrian detection accuracy, it is first necessary to improve the pedestrian detectivity (the ratio of the number of detected pedestrians to the total number of pedestrians included in the captured image) and a percentage of correct detections (the ratio of images that actually include pedestrians) at the same time.

Of course, when a pedestrian cannot be detected due to changes in environmental factors, it is not possible to improve the detectivity. When the determination criterion to determine whether an image includes the feature of the pedestrian is loosened so as to be able to detect a pedestrian even when the environmental factors change, an area that can be seen as having a shape close to a pedestrian by chance in the captured image is incorrectly detected as a pedestrian. Thus, the percentage of correct detections is reduced. On the contrary, when the determination criterion to determine whether an image includes the feature of a pedestrian is made strict to avoid a reduction in the percentage of correct detections caused by incorrect detection, it becomes difficult to detect a pedestrian due to the influence by changes in environmental factors. Thus, the detectivity is reduced. In this manner, after the pedestrian detection accuracy is improved to some extent, there is an antinomy relationship between the pedestrian detectivity and the percentage of correct detections. Thus, it is difficult to further improve the pedestrian detection accuracy.

PRIOR ART LITERATURES

Patent Literature

Patent Literature 1: JP-2012-220377-A

SUMMARY OF INVENTION

It is an object of the present disclosure to provide a pedestrian detection device that enables the detection accuracy when a pedestrian in a captured image is detected to be improved. It is another object of the present disclosure to provide a pedestrian detection method that enables the detection accuracy when a pedestrian in a captured image is detected to be improved.

According to a first aspect of the present disclosure, a pedestrian detection device mounted on a vehicle having a vehicular camera and at least one of a sonar and a radar, and analyzing a captured image captured by the vehicular camera to detect a pedestrian in the captured image, the pedestrian detection device includes: an identification dictionary storage unit that stores a plurality of kinds of identification dictionaries having different numerical values obtained by converting a plurality of features of a shape of the pedestrian in the captured image into a numerical form; a detection result accumulation unit that searches the plurality of kinds of identification dictionaries stored in the identification dictionary storage unit for a part of the captured image having one of the features described in the identification dictionaries to detect the pedestrian in the captured image, and accumulates a detection result for each of the identification dictionaries; a pedestrian position accumulation unit that detects the pedestrian disposed around the vehicle using at least one of the sonar and the radar, and accumulates a pedestrian position where the pedestrian is detected; an identification dictionary selection unit that compares the pedestrian position accumulated in the pedestrian position accumulation unit with a detection result for each of the identification dictionaries accumulated in the detection result accumulation unit, and selects one of the identification dictionaries having the detection result consistent with the pedestrian position as a detection identification dictionary; and a pedestrian detection unit that searches for a part of the captured image having one of the features described in the detection identification dictionary, and detects the pedestrian in the captured image.

In the above pedestrian detection device, even when an environmental factor changes, it is possible to select the most suitable identification dictionary from the plurality of kinds of identification dictionaries to detect a pedestrian in the captured image. Thus, it is possible to improve the pedestrian detection accuracy.

Further, the pedestrian detection device is capable of learning an identification dictionary according to an environmental change. Thus, it is possible to detect a pedestrian with high accuracy regardless of the environmental change.

According to a second aspect of the present disclosure, a pedestrian detection method applied to a vehicle having a vehicular camera and at least one of a sonar and a radar, and analyzing a captured image captured by the vehicular camera to detect a pedestrian included in the captured image, the pedestrian detection method includes: searching a plurality of kinds of identification dictionaries, described by converting a plurality of features of a shape of the pedestrian in the captured image into a numerical form, for a part of the captured image having one of the features described in the identification dictionaries to detect the pedestrian in the captured image; and accumulating a detection result for each of the identification dictionaries; detecting the pedestrian disposed around the vehicle using at least one of the sonar and the radar; and accumulating a pedestrian position where the pedestrian is detected; comparing the pedestrian position accumulated in the accumulating of the pedestrian position with the detection result for each of the identification dictionaries accumulated in the accumulating of the detection result; and selecting one of the identification dictionaries having the detection result consistent with the pedestrian position as a detection identification dictionary; and searching for a part of the captured image having one of the features described in the detection identification dictionary to detect the pedestrian in the captured image.

In the above pedestrian detection method, even when an environmental factor changes, it is possible to select the most suitable identification dictionary from the plurality of kinds of identification dictionaries to detect a pedestrian in the captured image. Thus, it is possible to improve the pedestrian detection accuracy.

Further, the pedestrian detection method is capable of learning an identification dictionary according to an environmental change. Thus, it is possible to detect a pedestrian with high accuracy regardless of the environmental change.

BRIEF DESCRIPTION OF DRAWINGS

The above and other objects, features and advantages of the present disclosure will become more apparent from the following detailed description made with reference to the accompanying drawings. In the drawings:

FIGS. 3A to 3F are explanatory diagrams illustrating the outlines of a method for detecting a pedestrian in a captured image;

EMBODIMENTS FOR CARRYING OUT INVENTION

Hereinbelow, embodiments will be described for clarifying the contents of the present disclosure described above.

A. Device Configuration

Figure 1:
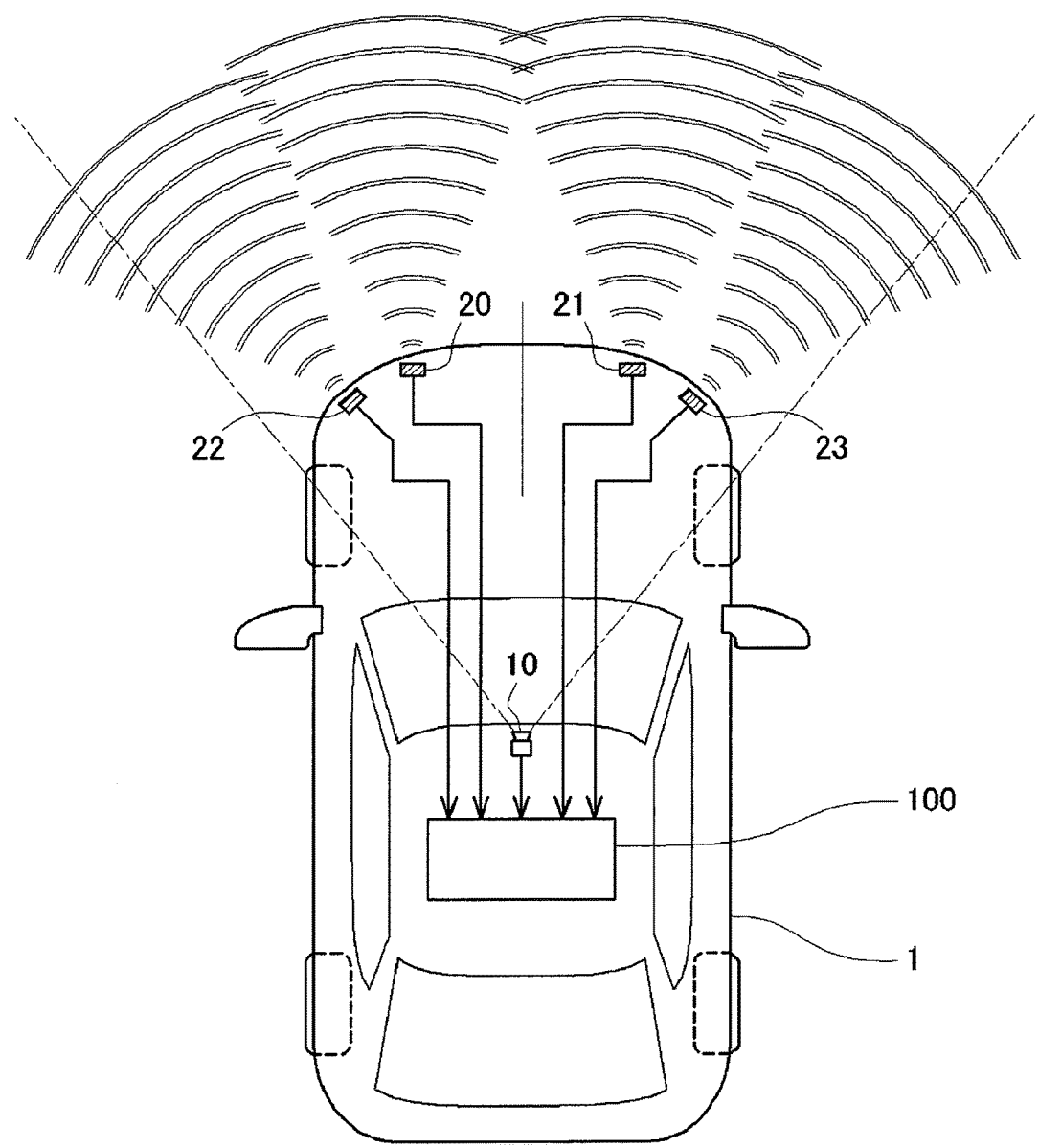
FIG. 1 is an explanatory diagram illustrating a vehicle 1 equipped with a pedestrian detection device 100 of an embodiment.

FIG. 1 illustrates a vehicle 1 equipped with a pedestrian detection device 100. As illustrated, the vehicle 1 is equipped with an vehicular camera 10 which captures an image of a forward area of the vehicle 1 and a plurality of sonars 20 to 23 in addition to the pedestrian detection device 100.

The vehicular camera 10 performs image capturing in a forward direction from the vehicle 1 at a predetermined image-capturing period and outputs an obtained captured image to the pedestrian detection device 100.

The sonar 20 which radiates a sound wave forward is mounted on the front left side of the vehicle 1, and the sonar 22 which radiates a sound wave in an obliquely forward left direction is mounted at a position on the outer left side with respect to the sonar 20. Similarly, the sonar 21 which radiates a sound wave forward is mounted on the front right side of the vehicle 1, and the sonar 23 which radiates a sound wave in an obliquely forward right direction is mounted at a position on the outer right side with respect to the sonar 21. These sonars 20 to 23 are capable of detecting, for example, a pedestrian by detecting a reflected wave formed by a radiated sound wave that has collided with the pedestrian and returned. Then, the obtained detection result is output to the pedestrian detection device 100. As described above, the sonars 20 to 23 radiate sound waves in different directions. Thus, the pedestrian detection device 100 is capable of detecting an approximate position of a pedestrian according to which one of the sonars 20 to 23 has detected the pedestrian.

In FIG. 1, the vehicular camera 10 is mounted with an orientation for capturing an image of the forward area from the vehicle 1, and the sonars 20 to 23 are mounted on the front side of the vehicle 1. Alternatively, the vehicular camera 10 may be mounted with an orientation for capturing an image of a rearward area from the vehicle 1, and the sonars 20 to 23 may be mounted on the rear side of the vehicle 1. Alternatively, the vehicular camera 10 may be mounted with an orientation for capturing an image of a lateral area from the vehicle 1, and the sonars 20 to 23 may be mounted on the lateral side of the vehicle 1. Further, these configurations may be combined. For example, an vehicular camera that captures an image of the forward area, an vehicular camera that captures an image of the rearward area, a plurality of sonars that radiate sound waves in the forward direction and the obliquely forward direction of the vehicle 1, and a plurality of sonars that radiate sound waves in the rearward direction and the obliquely rearward direction may be mounted.

In FIG. 1, the sonars 20 to 23 are used to detect a pedestrian. However, the present disclosure is not limited thereto, and a radar may be used to detect a pedestrian.

Figure 2:
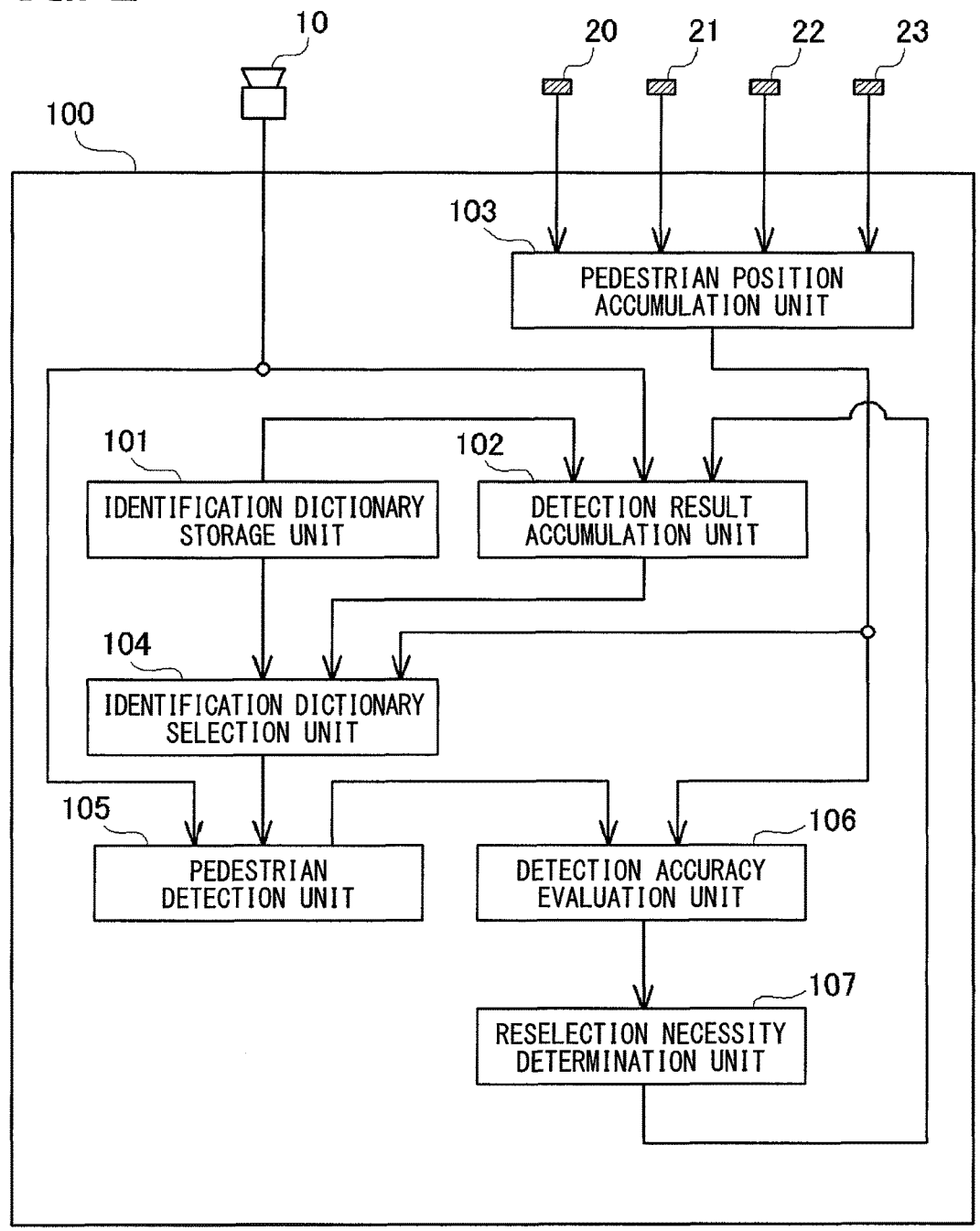
FIG. 2 is an explanatory diagram illustrating a schematic internal configuration of the pedestrian detection device 100.

FIG. 2 illustrates a schematic internal configuration of the pedestrian detection device 100 of the present embodiment. As illustrated, the pedestrian detection device 100 of the present embodiment includes an identification dictionary storage unit 101, a detection result accumulation unit 102, a pedestrian position accumulation unit 103, an identification dictionary selection unit 104, a pedestrian detection unit 105, a detection accuracy evaluation unit 106, and a reselection necessity determination unit 107.

These seven "units" are abstract concepts obtained by conveniently classifying the inside of the pedestrian detection device 100 with focusing on the function of the pedestrian detection device 100 which detects a pedestrian in a captured image, and thus do not represent that the pedestrian detection device 100 is physically divided into seven parts. Thus, each of these "units" may be achieved as a computer program executed by a CPU, may be achieved as an electronic circuit including an LSI and a memory, or may be achieved by a combination of the computer program and the electronic circuit.

Hereinbelow, the operations of these seven "units" will be described. For preparation for the description, a method for detecting a pedestrian in a captured image using an identification dictionary will be briefly described.

FIGS. 3A to 3F illustrate a rough method for detecting a pedestrian in a captured image using an identification dictionary. For example, as illustrated in FIG. 3A, a captured image that includes pedestrians H1 to H3 is obtained. To accelerate understanding, all the pedestrians H1 to H3 have the same size in the image.

Although the pedestrians H1 to H3 have different outer shapes, there are some common parts in the outer shapes thereof because of being pedestrians. For example, when an image of a part that includes the pedestrian H1 (refer to FIG. 3B), an image of a part that includes the pedestrian H2 (refer to FIG. 3C), and an image of a part that includes the pedestrian H3 (refer to FIG. 3D) are cut out from the captured image and an average in brightness of these images is taken, a brightness distribution having a dim human shape is obtained as schematically illustrated in FIG. 3E. Thus, when a part having such a brightness distribution is found in the captured image as a result of a search, it is assumed that the found part highly possibly includes a pedestrian. Thus, such a brightness distribution can be considered as a feature of the shape of the pedestrian in the captured image.

Although the feature focusing on the brightness distribution which is the easiest to understand has been described as an example of the feature of the shape of a pedestrian, the feature of the shape of a pedestrian is not limited thereto. In practice, various kinds of features extracted by various methods have been proposed, and any of the features may be used.

Then, the obtained feature (here, the human-shaped brightness distribution) is converted into a numerical form. A method for the numerical conversion may be any method as long as it is capable of expressing the features in numerical values. A plurality of numerical values are required to numerically express the feature. Thus, a plurality of numerical values can be obtained by converting the feature into a numerical form as illustrated in FIG. 3F.

Such a set of numerical values (here, a plurality of numerical values expressing the human-shaped brightness distribution) is the "identification dictionary". When an identification dictionary includes N numerical values, the identification dictionary is referred to as an N-dimensional identification dictionary. Further, each of the numerical values expressing the feature is referred to as a "feature value".

A space (feature value space) having a plurality of feature values included in the identification dictionary as coordinate axes will be considered. When the identification dictionary is an N-dimensional identification dictionary, both the number of feature values and the number of coordinate axes are also N. Thus, the feature value space is an N-dimensional feature value space. The identification dictionary can be represented as a coordinate point in the feature value space by using the feature value space.

The image including the pedestrian H1 illustrated in FIG. 3B is converted into a numerical form in the same manner as the method for converting the human-shaped brightness distribution image illustrated in FIG. 3E into the identification dictionary. The image illustrated in FIG. 3B also includes the pedestrian H1. Thus, the obtained plurality of feature values should be similar to those in the identification dictionary. Hereinbelow, an image from which the feature values are extracted is referred to as a "target image".

Thus, in the feature value space, a coordinate point corresponding to a plurality of feature values obtained from the image (target image G1) of FIG. 3B should be present near the coordinate point representing the identification dictionary.

Similarly, also in the image (target image G2) illustrated in FIG. 3C, since the target image G2 includes the pedestrian H2, a coordinate point corresponding to a plurality of feature values obtained from the target image G2 should be present near the coordinate point representing the identification dictionary in the feature value space. Similarly, also in the target image G3 illustrated in FIG. 3D, a coordinate point corresponding to the target image G3 should be present near the coordinate point representing the identification dictionary.

In this manner, when a target image includes a pedestrian, a coordinate point corresponding to the target image in the feature value space can be considered as being located near the coordinate point representing the identification dictionary.

Figure 4A:
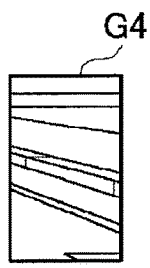
FIGS. 4A and 4B are explanatory diagrams illustrating, as an example, a target image that includes no pedestrian.

On the other hand, as illustrated in FIG. 4A as an example, in a target image G4 irrelevant to a pedestrian, since the target image G4 includes no pedestrian, a coordinate point corresponding to the target image G4 in the feature value space should be located away from the coordinate point representing the identification dictionary.

Figure 4B:
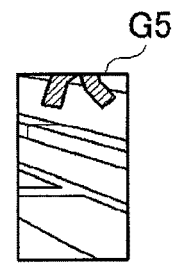

As illustrated in FIG. 4B as an example, also in a target image G5 which cannot be regarded as including a pedestrian although including a part of a pedestrian, a coordinate point corresponding to the target image G5 in the feature value space should be located away from the coordinate point representing the identification dictionary.

In this manner, when a target image includes no pedestrian, a coordinate point corresponding to the target image in the feature value space may be considered as being located away from the coordinate point representing the identification dictionary.

Thus, it can be determined whether a target image includes a pedestrian according to whether, when the target image is converted into a coordinate point in the feature value space, the coordinate point is present near the identification dictionary.

Figure 5:
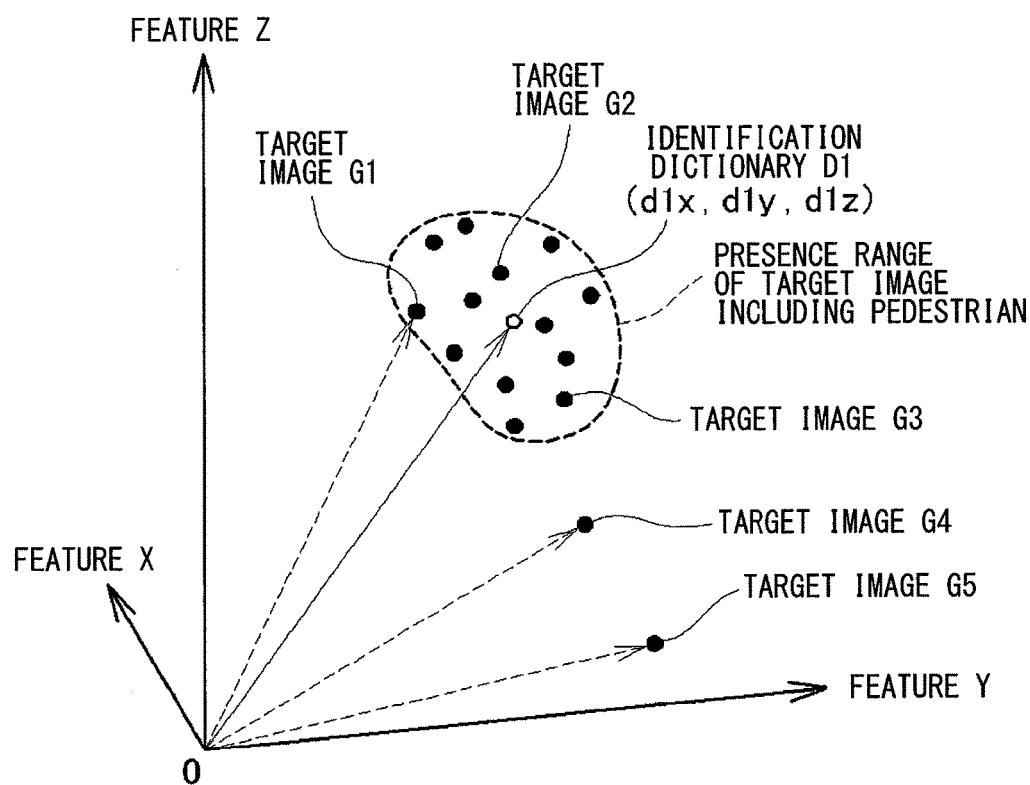
FIG. 5 is an explanatory diagram for a method for detecting a pedestrian in a captured image using an inner product value of an identification dictionary and a target image in a feature value space.

FIG. 5 illustrates a state of determining whether a target image includes a pedestrian with a three-dimensional identification dictionary. For example, when an identification dictionary D1 includes three numerical values of $d1x$, $d1y$, and $d1z$, coordinate points corresponding to target images including pedestrians are gathered around the identification dictionary D1. A range surrounded by a broken line in FIG. 5 indicates a presence range of coordinate points of such target images which include pedestrians. Thus, the coordinate points corresponding to the target image G1, the target image G2, and the target image G3 are also present within the range surrounded by the broken line.

On the other hand, the coordinate points corresponding to the target image G4 and the target image G5 which include no pedestrian are present outside the range surrounded by the broken line.

Thus, it is possible to determine whether a target image includes a pedestrian by calculating an inner product value of an identification dictionary (precisely, a vector representing a coordinate point of the identification dictionary) and the target image (precisely, a vector representing a coordinate point of the target image) in the feature value space. Specifically, when a target image includes a pedestrian, a coordinate point of the target image is present near the identification dictionary. Thus, the inner product value becomes large. On the other hand, when a target image includes no pedestrian, a coordinate point of the target image is present at a position away from the identification dictionary. Thus, the inner product value becomes small.

That is, when the inner product value of the identification dictionary and the target image in the feature value space is larger than a predetermined threshold, the target image is determined to include a pedestrian. On the other hand, when the inner product value is smaller than the predetermined threshold, the target image is determined to include no pedestrian.

The outlines of the method for detecting a pedestrian using an identification dictionary are as described above. However, in such a method, a pedestrian detection accuracy may be reduced according to changes in environmental factors. Specifically, a state of an imaged pedestrian gradually varies by the influences of the weather, time, and season when an image of the pedestrian is captured. Thus, the distribution range of coordinate points in the feature value space also varies.

Figure 6:
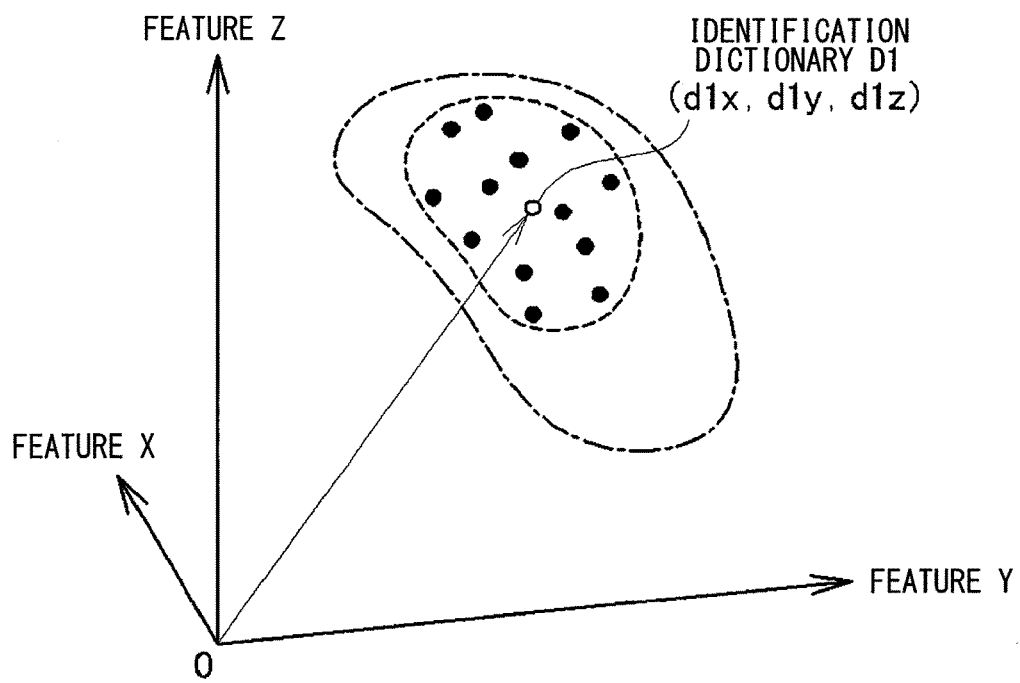
FIG. 6 is an explanatory diagram illustrating a reason of a reduction in a pedestrian detection accuracy caused by environmental factors.

FIG. 6 conceptually illustrates a state of the presence range of target images that include pedestrians varying according to various changes in the environmental factors. At the beginning, the presence range is as indicated by a broken line in FIG. 6. However, the presence range then varies according to changes in the environmental factors. Eventually, the presence range of the target images including pedestrians expands up to a range indicated by a dot-dash line in FIG. 6 when various changes in the environmental factors are taken into consideration. When the presence range expands in this manner, the inner product value with the identification dictionary D1 becomes small in spite of the fact that the image includes a pedestrian, and the image cannot be distinguished from an image that includes no pedestrian (the target image G5 of FIG. 5, for example).

Thus, the pedestrian detection device 100 of the present embodiment is provided with the seven "units" illustrated in FIG. 2 to enable a pedestrian to be detected with high detection accuracy without being affected by the environmental factors.

Figure 7:
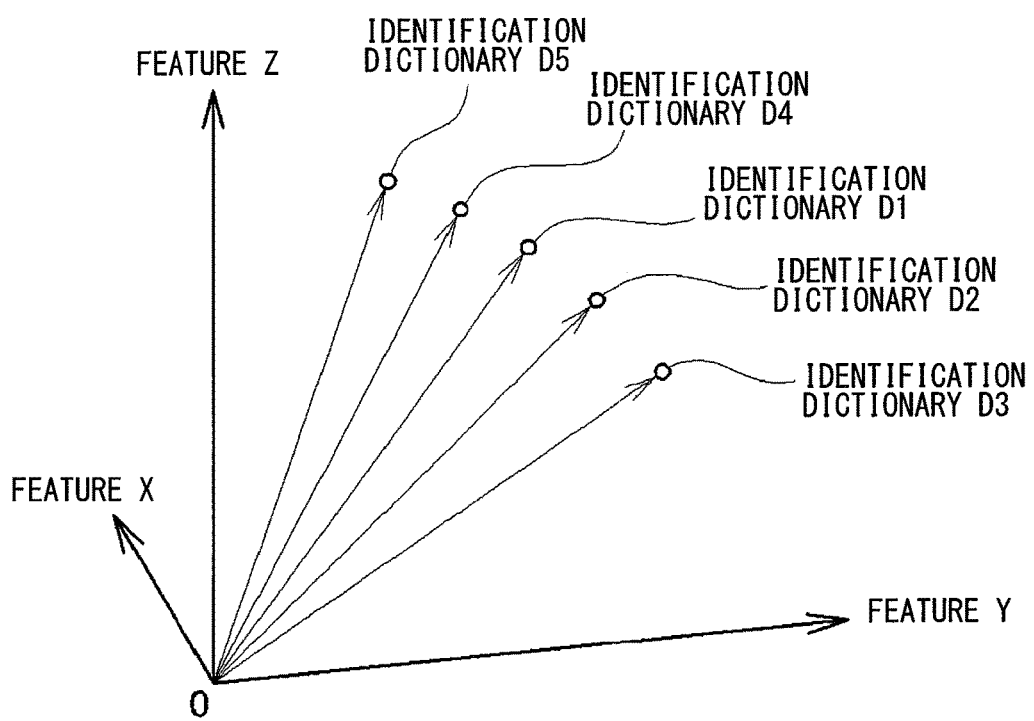
FIG. 7 is an explanatory diagram illustrating, as an example, a plurality of identification dictionaries that are previously stored.

In the seven "units", the identification dictionary storage unit 101 stores a plurality of kinds of identification dictionaries. FIG. 7 illustrates, as an example, five kinds of identification dictionaries D1 to D5 stored in the identification dictionary storage unit 101. In FIG. 7, each of the identification dictionaries is illustrated as a three-dimensional identification dictionary for convenience of illustration. However, the dimension of each of the identification dictionaries may be three or higher order dimension. Further, the identification dictionary storage unit 101 may store more than five kinds of identification dictionaries or less than five kinds of identification dictionaries.

Upon receiving a captured image from the vehicular camera 10, the detection result accumulation unit 102 detects a pedestrian in the captured image using a plurality of kinds of identification dictionaries stored in the identification dictionary storage unit 101 and accumulates the pedestrian detection result for each of the identification dictionaries. Processing for detecting a pedestrian in a captured image will be specifically described below.

The pedestrian position accumulation unit 103 detects a pedestrian using the sonars 20 to 23 and accumulates a position (pedestrian position) where the pedestrian has been detected. As described above with reference to FIG. 1, the sonars 20 to 23 detect pedestrians present in different directions. Thus, the pedestrian position accumulation unit 103 is capable of detecting an approximate position of a pedestrian on the basis of which one of the sonars 20 to 23 has detected the pedestrian and accumulates the detected pedestrian position.

The identification dictionary selection unit 104 reads the pedestrian position detection result obtained by the sonars 20 to 23 from the pedestrian position accumulation unit 103 and compares the read detection result with the pedestrian detection results accumulated in the detection result accumulation unit 102 for each of the identification dictionaries. Then, an identification dictionary having a pedestrian detection result that has the highest consistency with the pedestrian position detected by the sonars 20 to 23 is selected as a detection identification dictionary. Processing for selecting the detection identification dictionary will be specifically described below.

Upon receiving a captured image from the vehicular camera 10, the pedestrian detection unit 105 detects a pedestrian in the captured image using the identification dictionary (detection identification dictionary) selected by the identification dictionary selection unit 104.

The detection accuracy evaluation unit 106 receives the pedestrian detection result detected by the pedestrian detection unit 105 using the detection identification dictionary and the pedestrian position detected by the sonars 20 to 23, and calculates a detection accuracy of the detection identification dictionary. Processing for calculating the detection accuracy of the detection identification dictionary will be described below.

The reselection necessity determination unit 107 determines the necessity or unnecessity of reselection of the detection identification dictionary on the basis of the detection accuracy calculated by the detection accuracy evaluation unit 106. Then, when the reselection is determined to be necessary, the reselection necessity determination unit 107 outputs the determined result to the detection result accumulation unit 102 and restarts the accumulation of pedestrian detection results for each of the identification dictionaries in the pedestrian position accumulation unit 103.

This enables the pedestrian detection device 100 of the present embodiment to detect a pedestrian in a captured image with high accuracy without being affected by the environmental factors. Hereinbelow, the processing (pedestrian detection processing) for detecting a pedestrian by the pedestrian detection device 100 of the present embodiment will be specifically described.

B. Pedestrian Detection Processing of First Embodiment

Figure 8:
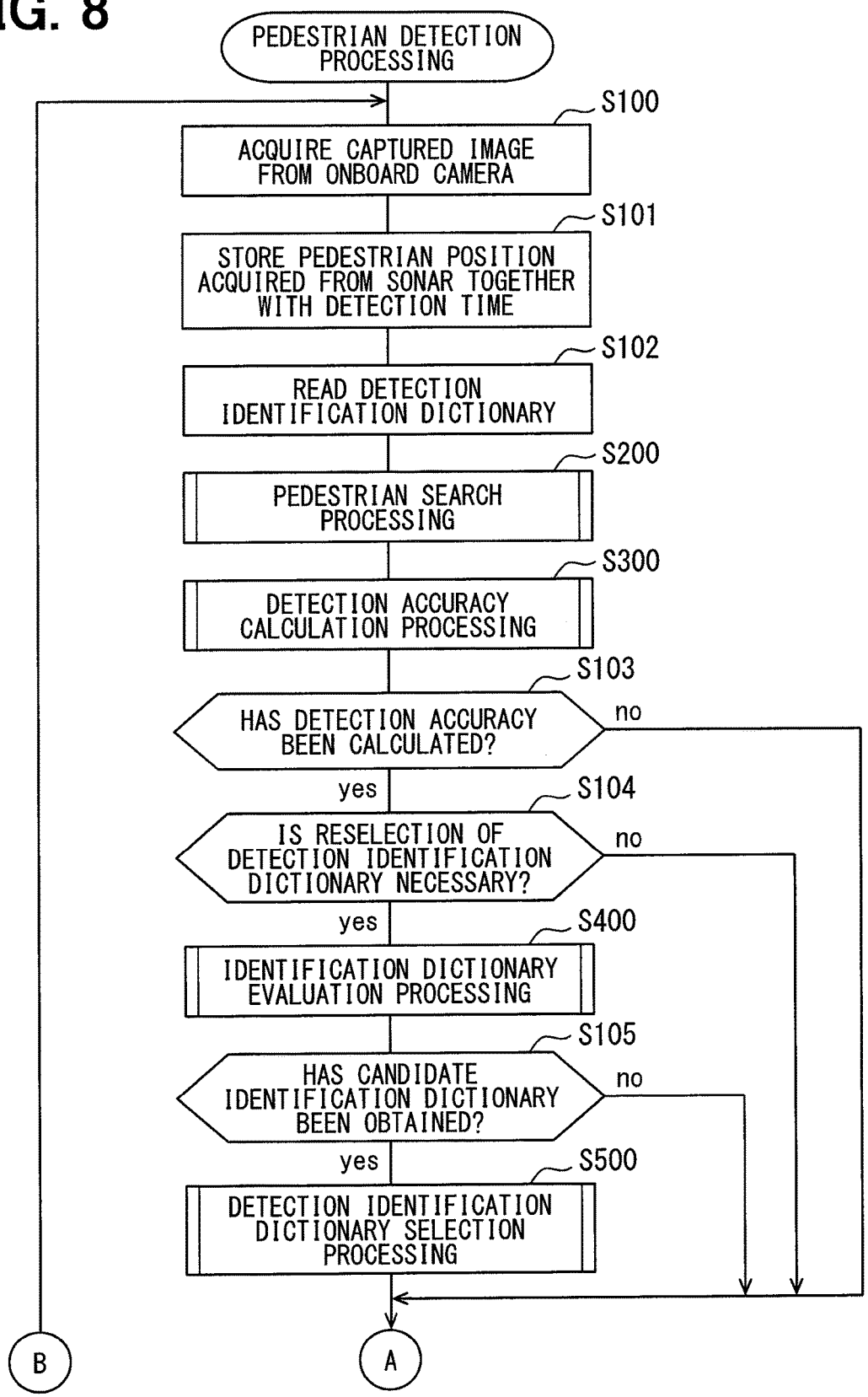
FIG. 8 is a flow chart of the first half of pedestrian detection processing of a first embodiment.
Figure 9:
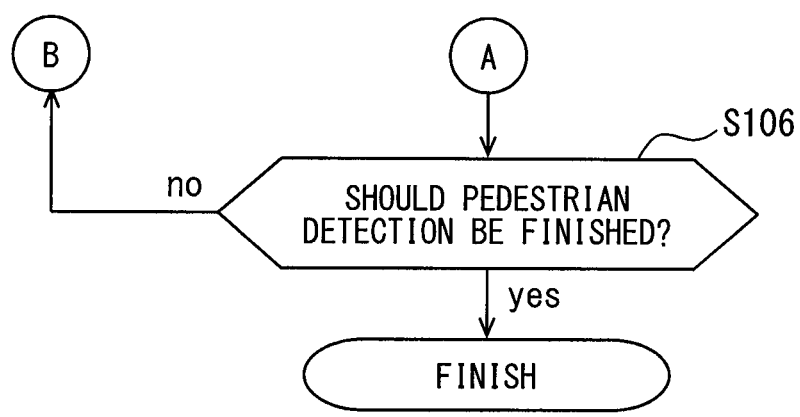
FIG. 9 is a flow chart of the second half of the pedestrian detection processing of the first embodiment.

FIGS. 8 and 9 illustrate a flow chart of the pedestrian detection processing of the first embodiment. The processing is executed by the pedestrian detection device 100 every time the vehicular camera 10 captures an image at a constant period.

As illustrated, in the pedestrian detection processing, a captured image is first acquired from the vehicular camera 10 (S100).

Then, a pedestrian position is acquired from the sonars 20 to 23 and stores the acquired pedestrian position in a memory (not illustrated) in the pedestrian detection device 100 together with a detection time of the pedestrian position (S101).

As described above, the sonars 20 to 23 detect pedestrians in different ranges in front of the vehicle 1. Thus, an approximate pedestrian position can be obtained according to which one of the sonars 20 to 23 has detected the pedestrian. For example, when the sonar 20 has detected a pedestrian, the pedestrian is determined to be present in an area on the front left side of the vehicle 1. When the sonar 22 has detected a pedestrian, the pedestrian is determined to be present in an area on the obliquely left front side of the vehicle 1. In S101, the approximate pedestrian position obtained in this manner is accumulated together with a time stamp indicating the detection time. This is executed using the above seven "units".

After the capture image is acquired (S100) and the pedestrian position is accumulated (S101) in this manner, a detection identification dictionary used for detecting a pedestrian is read from the identification dictionary storage unit 101 (S102). The detection identification dictionary is previously selected from a plurality of kinds of identification dictionaries stored in the identification dictionary storage unit 101 by a method described below. When the identification dictionary has not yet been selected, an identification dictionary (the identification dictionary D1 in the example illustrated in FIG. 7) that is set as a standard among the plurality of kinds of identification dictionaries stored in the identification dictionary storage unit 101 is read.

Then, pedestrian search processing for performing a search for a pedestrian in the captured image is started using the read detection identification dictionary (S200). Although details will be described below, in the pedestrian search processing, a target image in which the presence or absence of a pedestrian is to be determined is cut out from the captured image, and the feature of the pedestrian is extracted from the target image to convert the target image into a coordinate point in the feature value space (refer to FIG. 5). Then, an inner product value of the detection identification dictionary (precisely, a vector representing a coordinate point of the detection identification dictionary) and the target image (precisely, a vector representing the coordinate point of the target image) in the feature value space is calculated to determine whether the target image includes a pedestrian. Such an operation is executed throughout the entire range of the captured image to perform a search for a pedestrian in the captured image.

Then, detection accuracy calculation processing for calculating the pedestrian detection accuracy by the detection identification dictionary is started (S300). Although details of the detection accuracy calculation processing will also be described below, the detection accuracy by the detection identification dictionary is calculated in the following manner in the processing. First, the pedestrian detection result obtained by the pedestrian search processing (S200) is compared with the pedestrian position obtained from the sonars 20 to 23 to determine whether the pedestrian has been correctly detected, and the determination result is accumulated. When the number of accumulated determination results reaches an accumulation number (required number) required for accurately calculating the detection accuracy, the detection accuracy of the detection identification dictionary is calculated.

Thereafter, it is determined whether the detection accuracy of the detection identification dictionary has been obtained (S103). As described above, when the number of accumulated detection results to determine whether the pedestrian has been correctly detected is less than the required number, the detection accuracy of the detection identification dictionary cannot be calculated. Thus, when the accumulation number is less than the required number, it is determined that the detection accuracy has not yet been calculated (S103: no).

On the other hand, when the accumulation number has reached the required number, the detection accuracy of the detection identification dictionary has been calculated in the detection accuracy calculation processing (S300). Thus, it is determined that the detection accuracy has been calculated (S103: yes).

When the detection accuracy has been calculated (S103: yes), it is determined whether the reselection of the detection identification dictionary is necessary (S104). Specifically, the detection accuracy of the detection identification dictionary calculated in S300 is compared with a predetermined allowable accuracy. When the detection accuracy exceeds the allowable accuracy, the reselection is determined to be unnecessary (S104: no).

On the other hand, when the calculated detection accuracy is lower than the allowable accuracy, the reselection of the detection identification dictionary is determined to be necessary (S104: yes).

When the reselection is determined to be necessary (S104: yes), identification dictionary evaluation processing is started (S400). Although detailed processing contents thereof will be described below, in the identification dictionary evaluation processing (S400), an identification dictionary having the highest detection accuracy is selected from the plurality of kinds of identification dictionaries stored in the identification dictionary storage unit 101 and set as an identification dictionary (candidate identification dictionary) to be a candidate for a new detection identification dictionary.

Then, it is determined whether the candidate identification dictionary has been obtained (S105). Specifically, in order to accurately calculate the detection accuracy of the identification dictionary as described above, it is necessary to accumulate more detection results than the required number by the identification dictionary. Thus, when the accumulation number has not reached the required accumulation number, it is not possible to calculate the detection accuracy for each identification dictionary and thus not possible to set the candidate identification dictionary. Thus, in such a case, it is determined that no candidate identification dictionary has been obtained (S105: no).

On the other hand, when it is determined that the candidate identification dictionary has been obtained (S105: yes), a comparison between the detection accuracy of the candidate identification dictionary and the detection accuracy of the detection identification dictionary is performed. When the detection accuracy of the candidate identification dictionary is higher than the detection accuracy of the detection identification dictionary, detection identification dictionary selection processing for selecting the candidate identification dictionary as a new detection identification dictionary is started (S500). Detailed processing contents of the detection identification dictionary selection processing will also be described below.

When it is determined that no candidate identification dictionary has been obtained (S105: no), the detection identification dictionary selection processing (S500) is omitted. Further, in the first place, when it is determined that the detection accuracy of the detection identification dictionary has not been calculated (S103: no) and when the reselection of the detection identification dictionary is determined to be unnecessary (S104: no), the identification dictionary evaluation processing (S400) and the detection identification dictionary selection processing (S500) are omitted.

Thereafter, it is determined whether the pedestrian detection should be finished (S106 of FIG. 9). When it is determined that the pedestrian detection should not be finished (S106: no), a return to the start of the processing is made, and a captured image is acquired from the vehicular camera 10 (S100 of FIG. 8). Then, the series of processing steps (S101 to S106) described above is started.

On the other hand, when it is determined that the pedestrian detection should be finished (S106: yes), the pedestrian detection processing of the first embodiment illustrated in FIGS. 8 and 9 is finished.

B-1. Pedestrian Search Processing

Figure 10:
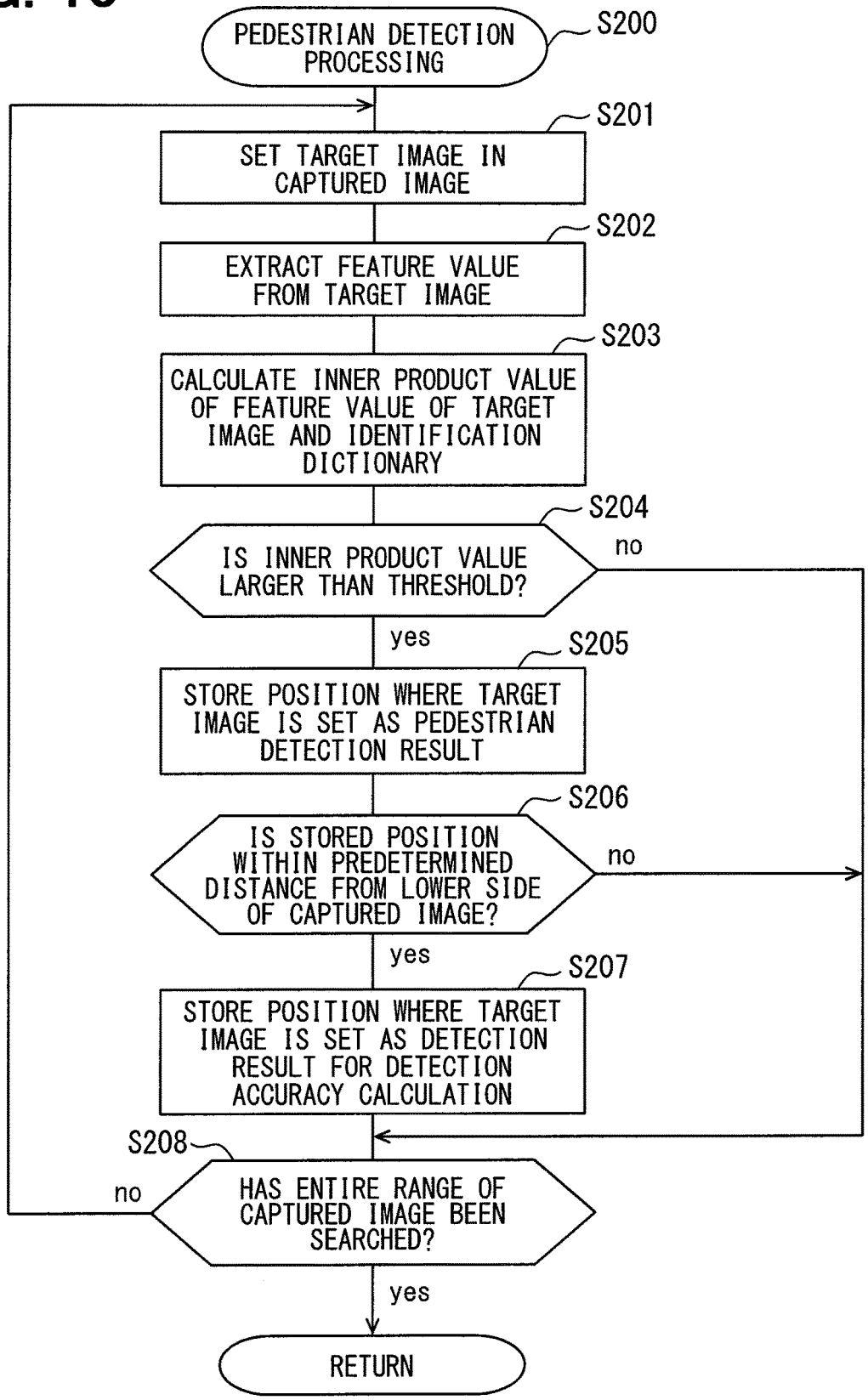
FIG. 10 is a flow chart of pedestrian search processing for performing a search for a pedestrian in a captured image.

FIG. 10 illustrates a flow chart of the pedestrian search processing (S200) for performing a search for the position of a pedestrian in the captured image. As described above, the processing is executed by the pedestrian detection device 100 in the pedestrian detection processing of the first embodiment.

As illustrated, in the pedestrian search processing, a target image to be a target for a pedestrian search is first set in the captured image (S201). The target image may be set at any position in the captured image. However, in order to set target images throughout the entire range of the captured image, it is desired to first set a target image at a corner position of the captured image and then set a target image at a position slightly displaced from the first set position.

Then, the target image set in the captured image is cut out, and the feature values of a pedestrian are extracted from the target image (S202). Accordingly, the target image is converted into a coordinate point in the feature value space described above with reference to FIG. 5.

Then, an inner product value of the coordinate point represented by the feature values of the target image in the feature value space and the coordinate point corresponding to the identification dictionary is calculated (S203). The identification dictionary used in the calculation of the inner product value is an identification dictionary used for determining whether the target image includes a pedestrian. Thus, when the pedestrian search processing (S200) is performed for detecting a pedestrian using the detection identification dictionary, the detection identification dictionary corresponds to the identification dictionary described herein. On the other hand, when a plurality of identification dictionaries are evaluated in the identification dictionary evaluation processing (S400) (described below), an individual identification dictionary stored in the identification dictionary storage unit 101 corresponds to the identification dictionary described herein.

Then, it is determined whether the calculated inner product value is larger than a predetermined threshold (S204). When the inner product value is larger than the threshold (S204: yes), the target image can be determined to include a pedestrian. Thus, the position where the target image is set in the captured image is stored as the position where the pedestrian has been detected in a memory (not illustrated) in the pedestrian detection device 100 (S205).

On the other hand, the inner product value is equal to or smaller than the threshold (S204: no), the target image can be determined to include no pedestrian. Thus, the position where the target image is set in the captured image is not stored.

Then, it is determined whether the position where the pedestrian has been detected in the captured image is located within a predetermined distance from the lower side of the captured image (S206). The determination is made because of the following reason.

In the detection accuracy calculation processing described below, a comparison between the pedestrian position detected by the pedestrian search processing (S200) and the pedestrian position detected by the sonars 20 to 23 is performed to calculate the pedestrian detection accuracy. In the pedestrian search processing (S200), when the captured image includes a pedestrian, the pedestrian can be detected. On the other hand, a distance within which the sonars 20 to 23 can detect a pedestrian is limited. Thus, a pedestrian present away by a predetermined distance or more cannot be detected by the sonars 20 to 23.

Thus, an approximate distance to a pedestrian in the captured image is estimated with focusing on the fact that a pedestrian present farther away is located on the upper part of the captured image. That is, a distance between the lower side of the captured image and the position where the pedestrian has been detected in the captured image is acquired. The acquired distance corresponds to the approximate distance to the pedestrian. Thus, when the distance from the lower side of the captured image falls within a predetermined distance (S206: yes), the pedestrian can be determined to be present within a distance detectable by the sonars 20 to 23. Thus, the position where the pedestrian has been detected (the position where the target image is set in the captured image) is stored as a detection result for detection accuracy calculation (S207).

On the other hand, when the distance from the lower side of the captured image falls out of the predetermined distance (S206: no), the detection result for detection accuracy calculation is not stored.

Then, it is determined whether the search for a pedestrian has been performed with target images set throughout the entire range of the captured image (S208). When a result of the determination indicates that a part where the search for a pedestrian has not been performed is left (S208: no), a return to the start of the processing is made, and a search image is set at a new position in the captured image (S201). Then, the following series of processing steps (S202 to S208) described above is started.

When it is determined that the search has been performed throughout the entire range of the captured image by repeating such processing (S208: yes), the pedestrian search processing of the first embodiment illustrated in FIG. 10 is finished, and a return to the pedestrian detection processing of FIG. 8 is made. As described above, in the pedestrian detection processing, when the return from the pedestrian search processing is made, the detection accuracy calculation processing (S300) is started.

B-2. Detection Accuracy Calculation Processing

Figure 11:
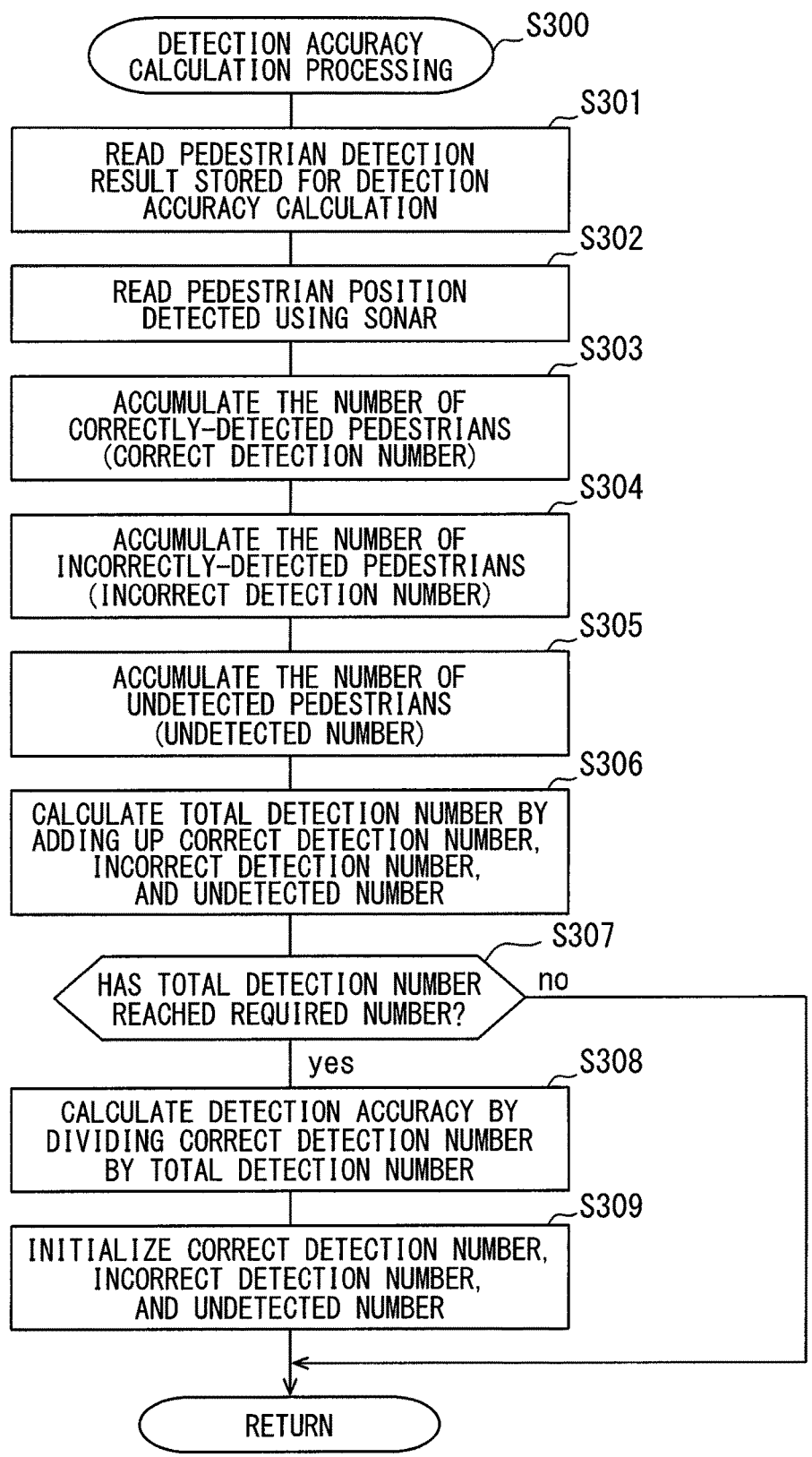
FIG. 11 is a flow chart of detection accuracy calculation processing for calculating the pedestrian detection accuracy.

FIG. 11 illustrates a flow chart of the detection accuracy calculation processing performed in the pedestrian detection processing of the first embodiment.

As illustrated, in the detection accuracy calculation processing (S300), a pedestrian detection result (the position where the pedestrian has been detected using the detection identification dictionary) stored for detection accuracy calculation in the above pedestrian search processing (S200) is read (S301). When a plurality of detection results are stored for detection accuracy calculation in the pedestrian search processing (S200), all the detection results are read.

Then, a pedestrian position detected using the sonars 20 to 23 is read (S302). As described above with reference to FIGS. 8 and 9, in the pedestrian detection processing, a captured image is acquired from the vehicular camera 10 (S100), and a pedestrian position detected using the sonars 20 to 23 is then stored in the memory in the pedestrian detection device 100 together with a time stamp (S101). Thus, in S302 of the detection accuracy calculation processing, a pedestrian position corresponding to a point of time when the capture image is acquired is read on the basis of information of the time stamp. When a plurality of corresponding pedestrian positions are stored, all the pedestrian positions are read.

Then, the pedestrian detection result obtained from the captured image (the detection result read in S301) is checked against the pedestrian position obtained from the sonars 20 to 23 (the pedestrian position read in S302) to detect a pedestrian of correct detection, and the number of detected pedestrians (the correct detection number) is accumulated (S303). In order to detect a pedestrian of correct detection, for each position where a pedestrian has been detected in the captured image, it is determined whether a pedestrian has been detected at a position corresponding to the above position also by the sonars 20 to 23.

Figure 12:
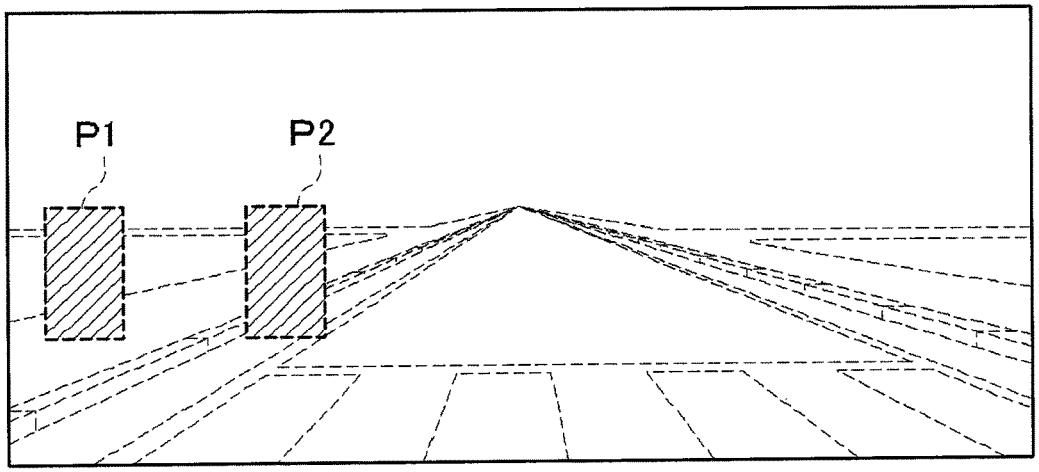
FIG. 12 is an explanatory diagram illustrating, as an example, a pedestrian detection result in a captured image.
Figure 13:
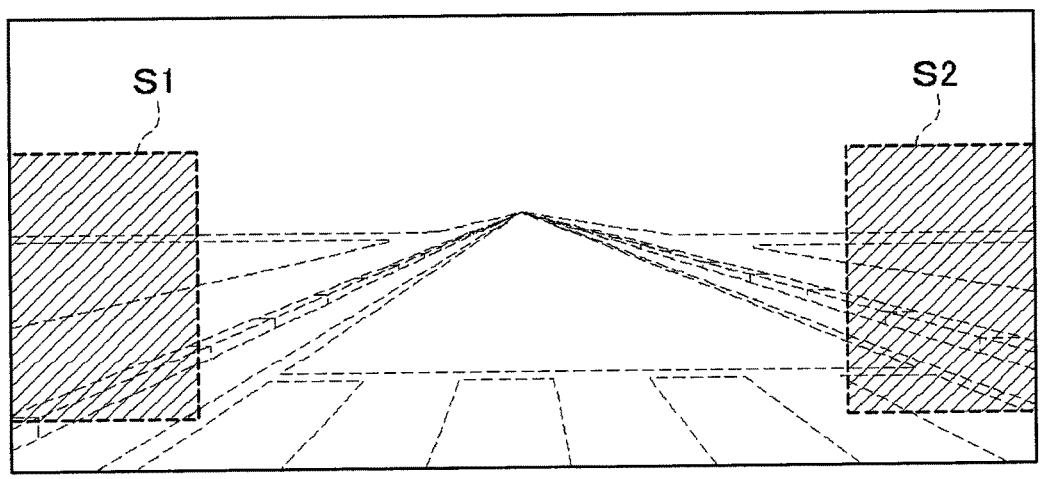
FIG. 13 is an explanatory diagram illustrating, as an example, a pedestrian detection result by sonars.

For example, as illustrated in FIG. 12, a detection position P1 and a detection position P2 are stored as detection results of pedestrian detection in the captured image. Further, as illustrated in FIG. 13, a pedestrian position S1 and a pedestrian position S2 are stored as pedestrian positions detected by the sonars 20 to 23. In this case, at the detection position P1 of FIG. 12, the pedestrian has been detected also by the sonars 20 to 23 (the pedestrian position S1 of FIG. 13). Thus, the detection can be determined to be a correct detection. On the other hand, at the detection position P2 of FIG. 12, no pedestrian has been detected by the sonars 20 to 23. Thus, the detection is determined to be an incorrect detection. Thus, in the example illustrated in FIGS. 12 and 13, the correct detection number is one.

In S303 of the detection accuracy calculation processing illustrated in FIG. 11, the correct detection number detected in this manner is added to a correct detection number already obtained for an identification dictionary (here, the detection identification dictionary) for detection accuracy calculation to accumulate the correct detection number of the detection identification dictionary.

The number of incorrectly-detected pedestrians (incorrect detection number) is accumulated following the accumulation of the correct detection number (S304). The incorrectly-detected pedestrians are obtained by removing the correctly-detected pedestrians (the pedestrians determined to be correctly-detected in S303) from the pedestrians detected from the captured image (the pedestrians read in S301). Referring to the example illustrated in FIGS. 12 and 13, the detection position P2 of FIG. 12 is determined to be an incorrect detection because no pedestrian has been detected by sonars 20 to 23 at the detection position P2. In this case, the incorrect detection number is one.

In S304 of the detection accuracy calculation processing illustrated in FIG. 11, the incorrect detection number detected in this manner is added to an incorrect detection number already obtained for the detection identification dictionary to accumulate the incorrect detection number.

The number of undetected pedestrians (undetected number) is accumulated following the accumulation of the correct detection number and the incorrect detection number (S305). The undetected pedestrian is a pedestrian who has been detected by sonars 20 to 23, but has not been detected in the captured image. Thus, in order to detect an undetected pedestrian, the pedestrian position read in S302 may be focused on, and it may be checked whether the corresponding position in the captured image has been read as a pedestrian detection position in S301.

For example, at the pedestrian position S1 of FIG. 13, the pedestrian has been detected also in the captured image (the detection position P1 of FIG. 12). Thus, the pedestrian can be determined not to be undetected. On the other hand, at the pedestrian position S2 of FIG. 13, no pedestrian has been detected in the captured image. Thus, the pedestrian is determined to be undetected. Thus, in the example illustrated in FIGS. 12 and 13, the undetected number is one.

Then, in S305 of the detection accuracy calculation processing illustrated in FIG. 11, the undetected number detected in this manner is added to an undetected number already obtained for the detection identification dictionary to accumulate the undetected number.

After the correct detection number, the incorrect detection number, and the undetected number are accumulated in this manner (S303 to S305), the correct detection number, the incorrect detection number, and the undetected number are added up to calculate a total detection number (S306). Then, it is determined whether the calculated total detection number has reached a required number for calculating the detection accuracy (S307).

The required number is desirably sufficiently large to calculate the detection accuracy with a sufficient accuracy. On the other hand, when the required number becomes too large, the detection accuracy can be rarely calculated. In view of this, the required number is set to a value within the range of several thousands to several tens of thousands (typically, approximately ten thousand).

When a result of the determination indicates that the total detection number has not reached the required number (S307: no), the detection accuracy calculation processing (S300) of FIG. 11 is finished without calculating the detection accuracy, and a return to the pedestrian detection processing of FIG. 8 is made.

Then, in the pedestrian detection processing, it is determined that the detection accuracy has not been obtained (S103 of FIG. 8: no), and it is determined whether the pedestrian detection should be finished (S106). When a result of the determination indicates that the pedestrian detection should not be finished (S106: no), the pedestrian detection processing is again executed from the start, and the detection accuracy calculation processing (S300) is started therein to accumulate the correct detection number, the incorrect detection number, and the undetected number for the detection identification dictionary (S303 to S305 of FIG. 11).

During the repetition of such processing, the total detection number of the correct detection number, the incorrect detection number, and the undetected number reaches the required number in the end, and "yes" is determined in S307. Thus, the accumulated correct detection number is divided by the total detection number to calculate the detection accuracy (S308).

After the calculation of the detection accuracy, all the accumulated correct detection number, incorrect detection number, and undetected number are initialized (S309). Thereafter, the detection accuracy calculation processing (S300) of FIG. 11 is finished, and a return to the pedestrian detection processing of FIG. 8 is made.

In the pedestrian detection processing, it is determined that the detection accuracy has been obtained (S103 of FIG. 8: yes). Then, when the detection accuracy is lower than the allowable accuracy, the reselection of the detection identification dictionary is determined to be necessary (S104: yes), and the identification dictionary evaluation processing (S400) is started.

B-3. Identification Dictionary Evaluation Processing

Figure 14:
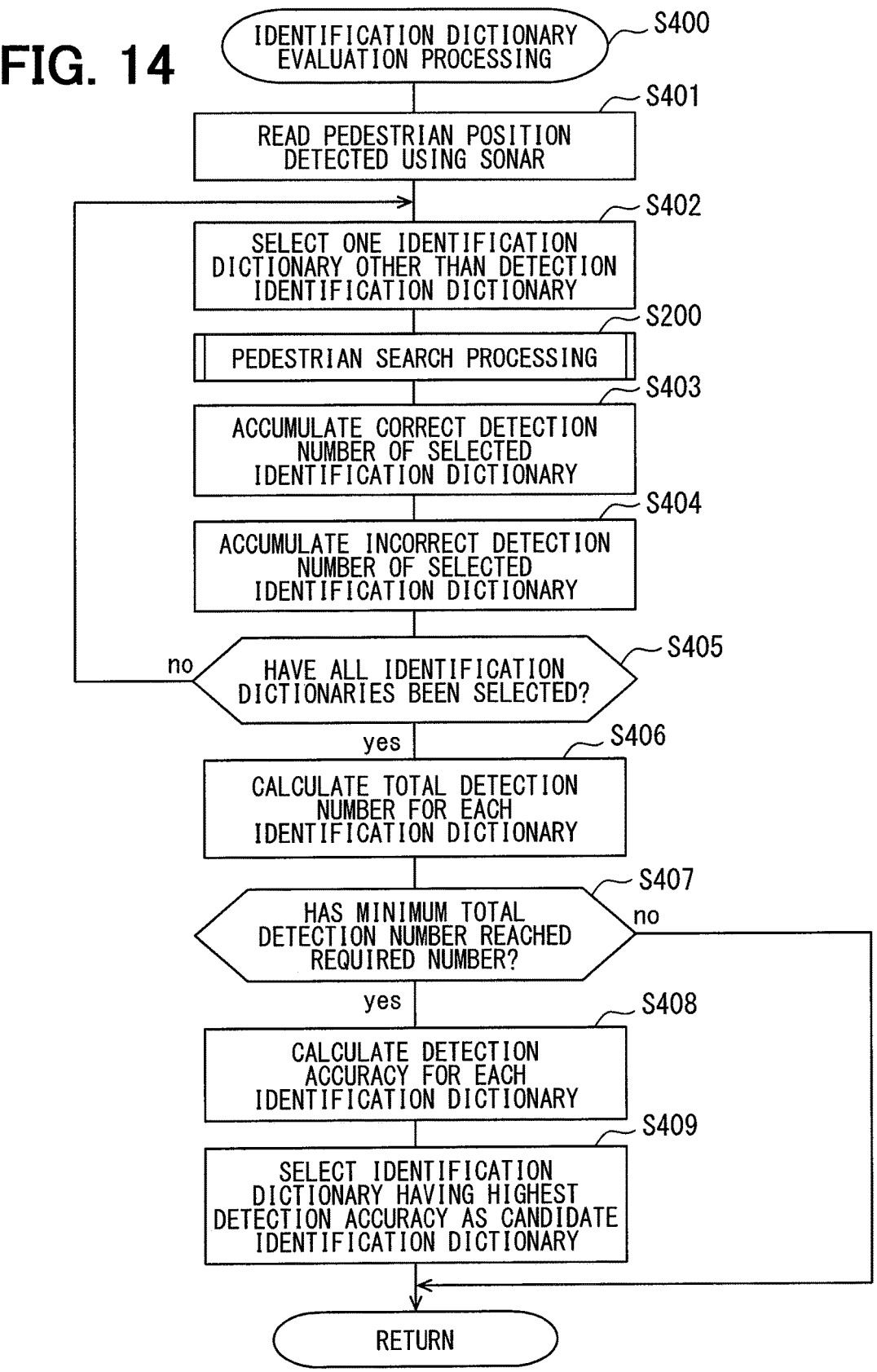
FIG. 14 is a flow chart of identification dictionary evaluation processing for evaluating the detection accuracies of a plurality of identification dictionaries.

FIG. 14 illustrates a flow chart of the identification dictionary evaluation processing (S400).

As illustrated, when the identification dictionary evaluation processing (S400) is started, a pedestrian position detected by the sonars 20 to 23 and stored in the memory together with a time stamp is first read (S401).

Then, one identification dictionary other than the detection identification dictionary is selected from the plurality of kinds of identification dictionaries stored in the identification dictionary storage unit 101 (S402), and the pedestrian search processing is started using the selected identification dictionary (S200). In the pedestrian detection processing described above with reference to FIGS. 8 and 9, the detection identification dictionary is selected (S102), and the pedestrian search processing (S200) is then started with respect to the detection identification dictionary. On the other hand, in the identification dictionary evaluation processing (S400) of FIG. 14, the pedestrian search processing (S200) is started with respect to the identification dictionary selected in S402. Details of the pedestrian search processing (S200) have already been described with reference to FIG. 10. Thus, description thereof will be omitted.

After a search for a pedestrian in the captured image is performed using the selected identification dictionary (S200), the correct detection number and the incorrect detection number of the identification dictionary are accumulated (S403, S404) using the pedestrian detection result stored for detection accuracy calculation in the pedestrian search processing (S200). A method for accumulating the correct detection number and the incorrect detection number of the identification dictionary is similar to the method for accumulating the correct detection number and the incorrect detection number of the detection identification dictionary described above with reference to FIGS. 11 to 13. Thus, description thereof will be omitted.

Then, it is determined whether all the identification dictionaries (except the detection identification dictionary) stored in the identification dictionary storage unit 101 have been selected (S405). When an unselected identification dictionary is left (S405: no), a return to S402 is made to select a new identification dictionary. Thereafter, the above processing steps (S200, S403, and S404) are performed on the selected identification dictionary.

When it is determined that all the identification dictionaries except the detection identification dictionary have been selected after the repetition of such processing (S405: yes), the accumulated correct detection number and incorrect detection number are added up for each of the identification dictionaries to calculate the total detection number for each of the identification dictionaries (S406).

Then, it is determined whether the minimum one of the total detection numbers calculated for the respective identification dictionaries has reached the required number for calculating the detection accuracy (S407).

When a result of the determination indicates that the minimum total detection number has reached the required number (S407: yes), the detection accuracy is calculated for each of the identification dictionaries by dividing the correct detection number by the total detection number in each of the identification dictionaries (S408). Then, an identification dictionary having the highest detection accuracy among the detection accuracies obtained for the respective identification dictionaries is selected as a candidate identification dictionary (S409). Then, the identification dictionary evaluation processing of FIG. 14 is finished.

On the other hand, when it is determined that the minimum one of the total detection numbers calculated in S406 has not reached the required number (S407: no), the identification dictionary evaluation processing of FIG. 14 is finished without selecting a candidate identification dictionary, and a return to the pedestrian detection processing of FIG. 8 is made.

As described above with reference to FIG. 8, in the pedestrian detection processing, when the return from the identification dictionary evaluation processing (S400) is made, it is determined whether the candidate identification dictionary has been obtained (S105). When the candidate identification dictionary has been obtained (S105: yes), the detection identification dictionary selection processing (S500) described below is started. On the other hand, when no candidate identification dictionary has been obtained (S105: no), the detection identification dictionary selection processing (S500) is omitted.

B-4. Detection Identification Dictionary Selection Processing

Figure 15:
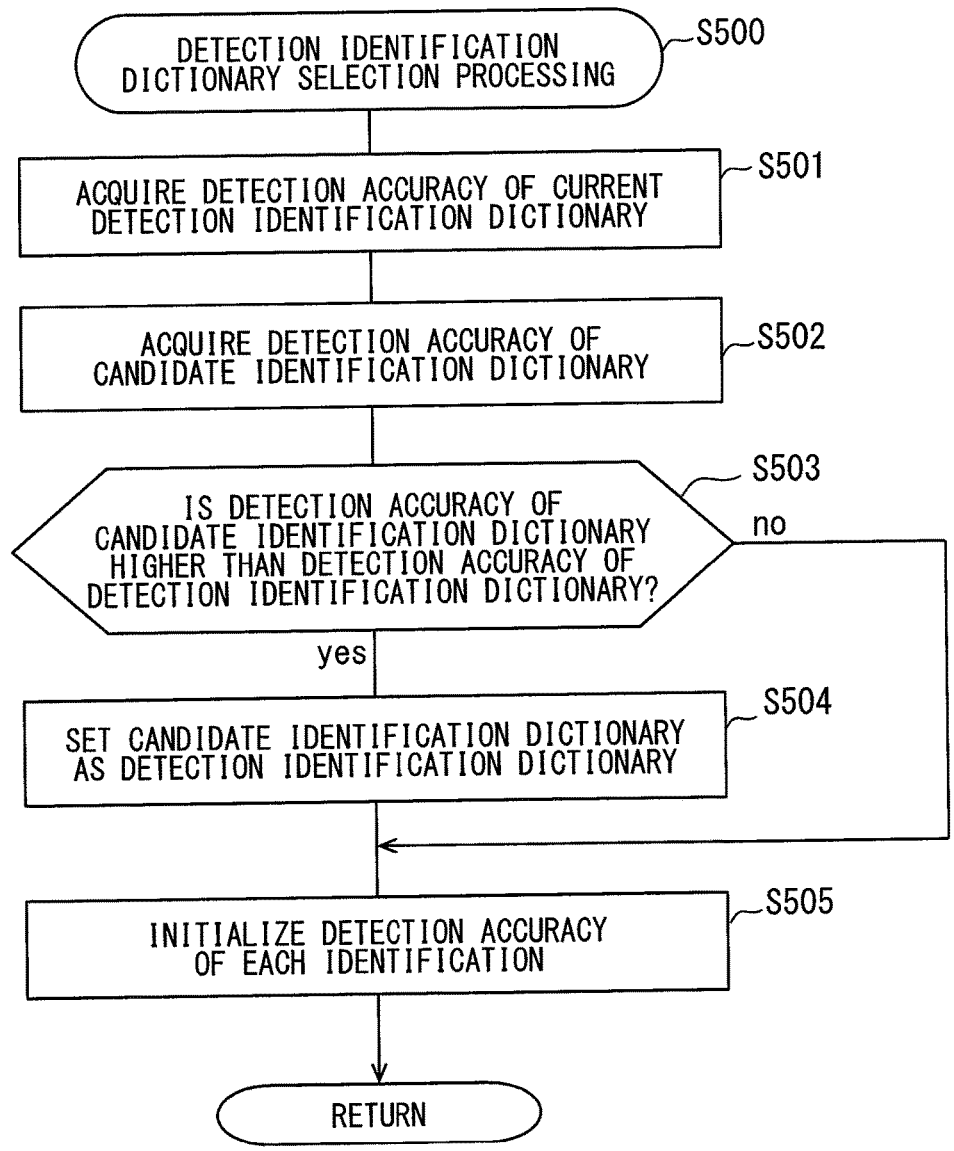
FIG. 15 is a flow chart of detection identification dictionary selection processing for changing a detection identification dictionary used for detecting a pedestrian on the basis of evaluation results for the plurality of identification dictionaries.

FIG. 15 illustrates a flow chart of the detection identification dictionary selection processing. As described above, the processing is started by the pedestrian detection device 100 when the reselection of the detection identification dictionary is determined to be necessary (S104: yes) and the candidate identification dictionary has been obtained (S105: yes) in the pedestrian detection processing of FIG. 8.

As illustrated, when the detection identification dictionary selection processing (S500) is started, the detection accuracy of the current detection identification dictionary is first acquired (S501). The detection accuracy of the detection identification dictionary is obtained in the detection accuracy calculation processing (S300) described above with reference to FIG. 11 and stored in the memory in the pedestrian detection device 100.

Then, the detection accuracy of the candidate identification dictionary is acquired (S502). The detection accuracy of the candidate identification dictionary is obtained in the identification dictionary evaluation processing (S400) described above with reference to FIG. 14 and stored in the memory in the pedestrian detection device 100.

In the present embodiment, since the detection accuracy of the detection identification dictionary has already been obtained in the detection accuracy calculation processing (S300), the detection accuracies of the identification dictionaries other than the detection identification dictionary are calculated in the identification dictionary evaluation processing (S400). Thus, in the detection identification dictionary selection processing of FIG. 15, the detection accuracy of the detection identification dictionary obtained in the detection accuracy calculation processing (S300) is acquired (S501), and the detection accuracy of the candidate identification dictionary obtained in the identification dictionary evaluation processing (S400) is acquired (S502).

Alternatively, the detection accuracy of the detection identification dictionary may be calculated when the detection accuracies of the other identification dictionaries are calculated in the identification dictionary evaluation processing (S400). Then, an identification dictionary having the highest detection accuracy among the identification dictionaries other than the detection identification dictionary may be selected as a candidate identification dictionary. In this case, in the detection identification dictionary selection processing of FIG. 15, the detection accuracy of the detection identification dictionary and the detection accuracy of the candidate identification dictionary obtained in the identification dictionary evaluation processing (S400) are respectively acquired in S501 and S502. Accordingly, it is possible to calculate both the detection accuracy of the detection identification dictionary and the detection accuracy of the candidate identification dictionary from the same captured image. Thus, the detection accuracies of the two identification dictionaries can be accurately compared.

However, the detection accuracy of the identification dictionary is calculated using a sufficient number of detection results as described above. Thus, using different captured images in calculation of the detection accuracy produces no practical program. Thus, the detection accuracy already obtained in the detection accuracy calculation processing (S300) is used as the detection accuracy of the detection identification dictionary. Further, in the identification dictionary evaluation processing (S400), the detection accuracies of the identification dictionaries other than the detection identification dictionary are calculated. Accordingly, the processing load can be reduced.

After the detection accuracy of the detection identification dictionary and the detection accuracy of the candidate identification dictionary are acquired in this manner (S501, S502), it is determined whether the detection accuracy of the candidate identification dictionary is higher than the detection accuracy of the detection identification dictionary (S503).

When a result of the determination indicates that the detection accuracy of the candidate identification dictionary is higher than the detection accuracy of the detection identification dictionary (S503: yes), the candidate identification dictionary is set as a new detection identification dictionary (S504). As a result, the candidate identification dictionary is used as the detection identification dictionary in the pedestrian detection processing thereafter.

On the other hand, when the detection accuracy of the detection identification dictionary is higher than the detection accuracy of the candidate identification dictionary (S503: no), the candidate identification dictionary is not set as a detection identification dictionary. As a result, the current detection identification dictionary is continuously used also thereafter.

When the detection identification dictionary to be used thereafter is selected in the above manner, the detection accuracies obtained for the respective identification dictionaries including the detection identification dictionary and the candidate identification dictionary are initialized (S505). Then, the detection identification dictionary selection processing (S500) of FIG. 15 is finished, and a return to the pedestrian detection processing of FIG. 8 is made.

As described above with reference to FIGS. 8 and 9, in the pedestrian detection processing, when the return from the detection identification dictionary selection processing (S500) is made, it is determined whether the pedestrian detection should be finished (S106 of FIG. 9).

When a result of the determination indicates that the pedestrian detection should not be finished (S106: no), a return to the start of the pedestrian detection processing is made, and a new captured image is acquired from the vehicular camera 10 (S100 of FIG. 8). Then, the following series of processing steps described above is started.

On the other hand, when it is determined that the pedestrian detection should be finished (S106: yes), the pedestrian detection processing of the first embodiment illustrated in FIGS. 8 and 9 is finished.

The pedestrian detection device 100 of the first embodiment detects a pedestrian in a captured image by the above pedestrian detection processing. Thus, it is possible to detect a pedestrian with high accuracy without being affected by the environmental factors because of the following reasons.

First, as described above with reference to FIG. 6, when the presence range of target images that include pedestrians in the feature value space is located within a narrow range surrounded by a broken line, the pedestrian can be detected with high accuracy. That is, setting an appropriate identification dictionary D1 enables the inner product value with the identification dictionary D1 to be large for any target image that includes a pedestrian. Thus, when a target image includes a pedestrian, the pedestrian can be reliably detected. Further, a target image that incudes no pedestrian is not incorrectly detected as including a pedestrian.

On the other hand, the presence range of target images that include pedestrians may expand to the range surrounded by a dot-dash line due to the influences of various environmental factors. In this case, even if any identification dictionary D1 is set, a target image whose inner product value with the identification dictionary D1 does not become sufficiently large in spite of the fact that the target image includes a pedestrian is generated. When the pedestrian in such a target image is detected, it is difficult to distinguish the target image from a target image that includes no pedestrian (the target image G4 or the target image G5 in FIG. 5, for example), which increases incorrect detections. When the threshold of the inner product value which is a determination criterion to determine whether a target image includes a pedestrian is made higher to avoid the above problem, a case in which a pedestrian cannot be detected in spite of the fact that the target image includes the pedestrian increases. Thus, the detectivity is reduced.

It has been conventionally considered that the range surrounded by a broken line in FIG. 6 expands to the range surrounded by a dot-dash line due to the influences of changes in the environmental factors. However, when various environmental factors are not collectively considered and an individual environment during image capturing is focused on, it is less conceivable that the presence range of target images that include pedestrians largely expands due to differences in environment. Thus, in practice, it can be considered that the influences caused by changes in the environmental factors do not expand the presence range of the target images that include pedestrians, but move the presence range.

Figure 16:
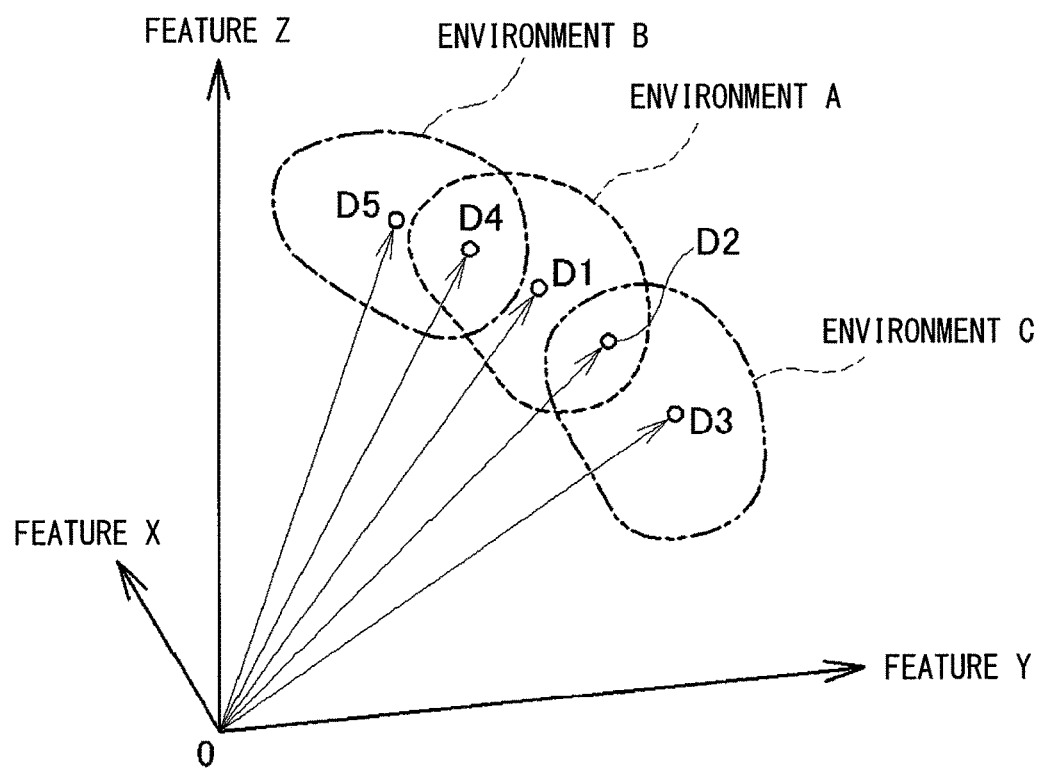
FIG. 16 is an explanatory diagram illustrating a reason why the pedestrian detection accuracy can be improved.

That is, as conceptually illustrated in FIG. 16, when an environment during image capturing is an environment A, the presence range of target images that include pedestrians is a range surrounded by a broken line in FIG. 16. In an environment B, the presence range moves to a range surrounded by a dash-dot line. In an environment C, the presence range moves to a range surrounded by a chain double-dashed line. When these various environments are collectively considered, it is conceivable that the presence range of target images that include pedestrians expands as indicated by a dot-dash line in FIG. 6.

Thus, as illustrated in FIG. 16, in a captured image obtained under the environment B, a pedestrian may be detected using the identification dictionary D5. In the captured image obtained under the environment B, target images that include pedestrians are present within the range surrounded by the dot-dash line in FIG. 16. Thus, the inner product value with the identification dictionary D5 becomes large for any target image that includes a pedestrian. Therefore, it is possible to reliably detect the pedestrian in the target image. Further, a target image that includes no pedestrian is not incorrectly detected as including a pedestrian.

Similarly, in a captured image obtained under the environment C, a pedestrian may be detected using the identification dictionary D3. Further, a pedestrian may be detected using the identification dictionary D4 in the middle of a change from the environment A to the environment B and detected using the identification dictionary D2 in the middle of a change from the environment A to the environment C.

As described above, in the pedestrian detection processing of the first embodiment, it is possible to evaluate a plurality of kinds of identification dictionaries (S400 of FIG. 8) to change the detection identification dictionary (S500). Thus, an appropriate identification dictionary can be selected according to changes in environment. As a result, it is possible to detect a pedestrian with high accuracy without being affected by the environmental factors.

C. Pedestrian Detection Processing of Second Embodiment:

In the above pedestrian detection processing of the first embodiment, the plurality of kinds of identification dictionaries stored in the identification dictionary storage unit 101 are previously determined, and an appropriate identification dictionary is selected from the prescribed identification dictionaries according to a change in environment during image capturing.

Alternatively, a new identification dictionary may be generated by learning and stored in the identification dictionary storage unit 101. Further, an appropriate identification dictionary may be selected from a plurality of kinds of identification dictionaries including the identification dictionary added by learning.

Figure 17:
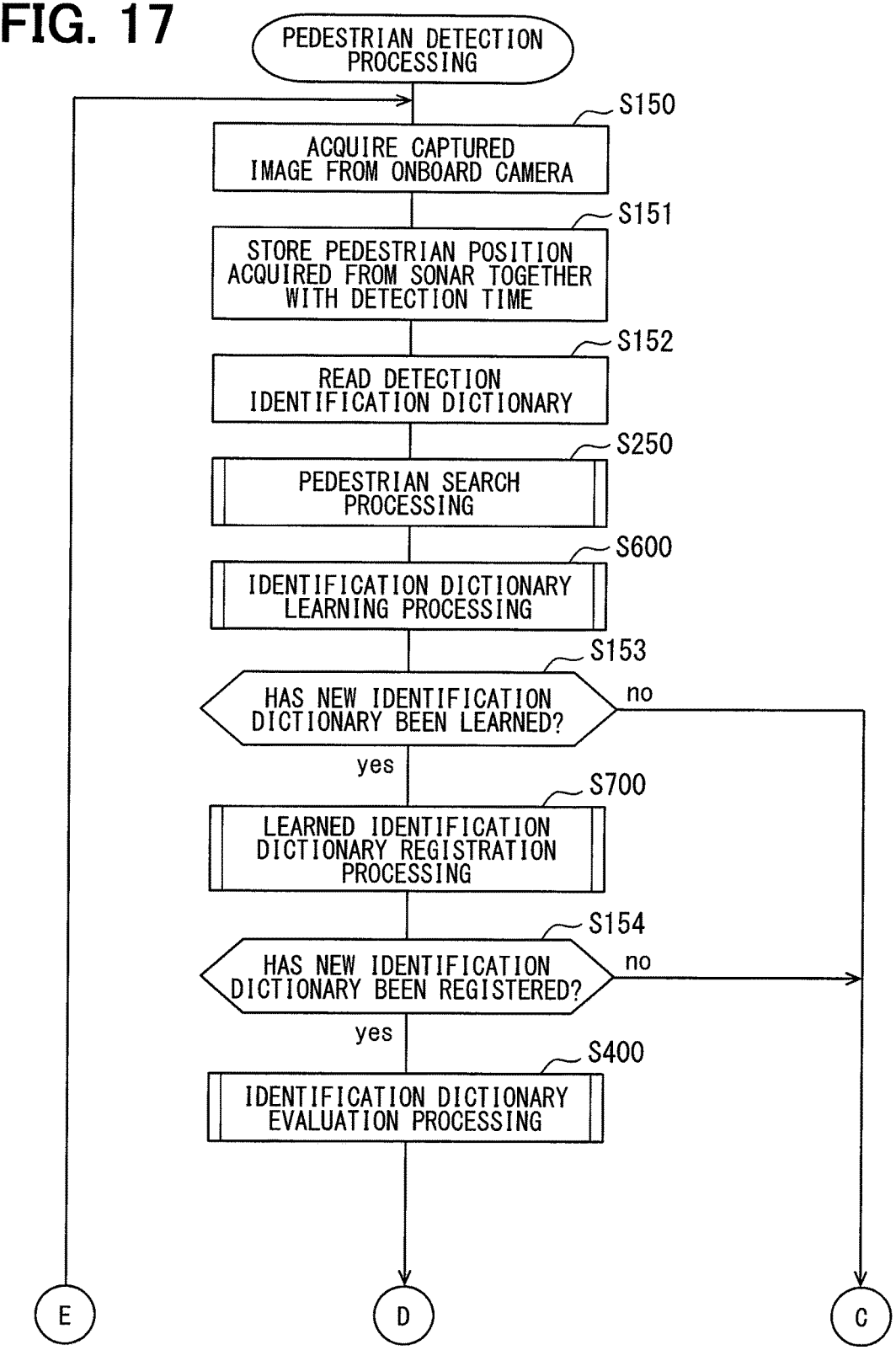
FIG. 17 is a flow chart of the first half of pedestrian detection processing of a second embodiment.
Figure 18:
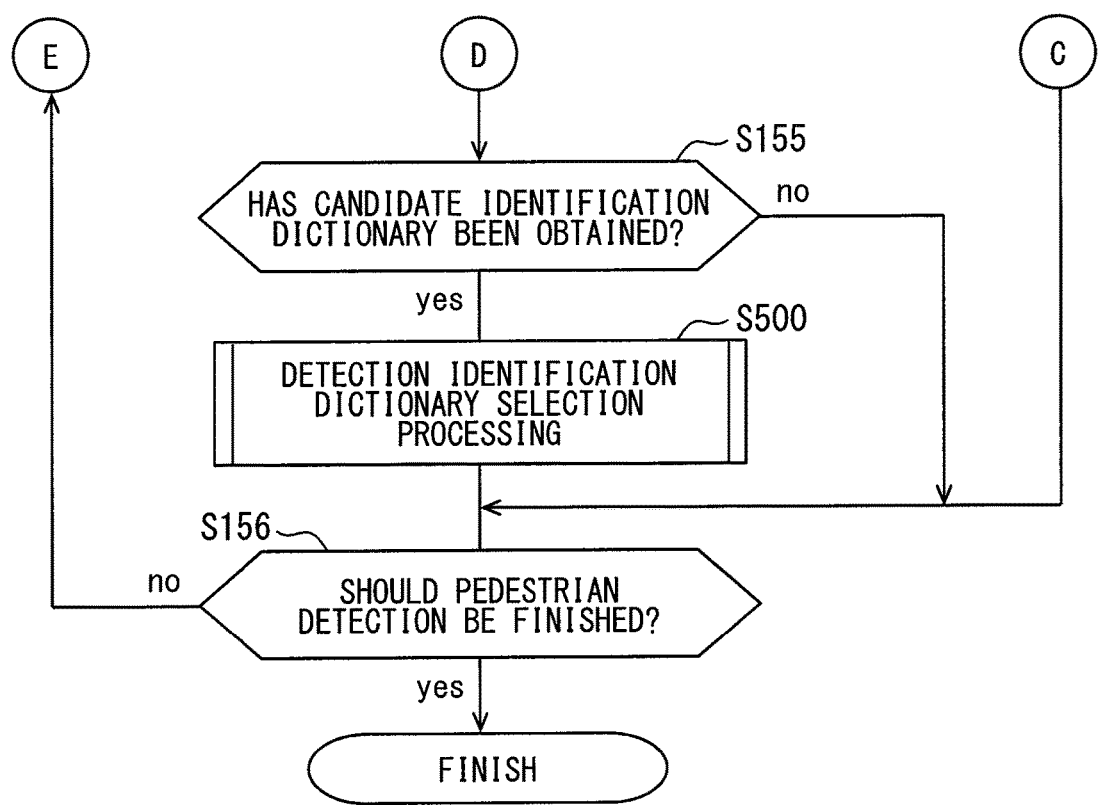
FIG. 18 is a flow chart of the second half of the pedestrian detection processing of the second embodiment.

FIGS. 17 and 18 illustrate a flow chart of pedestrian detection processing of a second embodiment. The processing is also executed by the pedestrian detection device 100 every time the vehicular camera 10 captures an image at a constant period similarly to the pedestrian detection processing of the first embodiment described above with reference to FIGS. 8 and 9.

As illustrated, when the pedestrian detection processing of the second embodiment is started, a captured image is acquired from the vehicular camera 10 (S150). Then, a pedestrian position is acquired from the sonars 20 to 23 and stored in the memory (not illustrated) in the pedestrian detection device 100 together with a detection time (time stamp) of the pedestrian position (S151).

Then, a detection identification dictionary is read from the identification dictionary storage unit 101 (S152), and pedestrian search processing of the second embodiment is started (S250). The pedestrian search processing of the second embodiment (S250) is similar to the pedestrian search processing of the first embodiment (S200) described above with reference to FIG. 10. However, in the pedestrian search processing of the second embodiment (S250), when a pedestrian has been detected, not only the position of a target image in which the pedestrian has been detected, but also the feature values extracted from the target image are stored. Detailed processing contents of the pedestrian search processing of the second embodiment (S250) will be described below.

Then, in the pedestrian detection processing of the second embodiment, identification dictionary learning processing (S600) for learning an identification dictionary is started. Although details thereof will be described below, a pedestrian detection result obtained in the pedestrian search processing (S250) (that is, the position where the target image is set and the feature values extracted from the target image) is used in the learning of the identification dictionary.

Then, it is determined whether a new identification dictionary has been learned in the identification dictionary learning processing (S600) (S153). As described below, the accumulation of a certain number of pedestrian detection results is required in the learning of an identification dictionary. Thus, when the accumulated detection results are not sufficient, it is not possible to learn a new identification dictionary in the identification dictionary learning processing (S600).

Thus, it is determined whether a new identification dictionary has been learned (S153). When a new identification dictionary has been learned (S153: yes), it is determined whether the new dictionary deserves registration. When the new dictionary deserves registration, learned identification dictionary registration processing (S700) for registering the new identification dictionary in the identification dictionary storage unit 101 is performed. Detailed processing contents of the learned identification dictionary registration processing (S700) will be described below.

Then, it is determined whether the new identification dictionary has been registered (S154). When a result of the determination indicates that the new identification dictionary has been registered (S154: yes), identification dictionary evaluation processing (S400) is started.

The contents of the identification dictionary evaluation processing (S400) are similar to those of the identification dictionary evaluation processing (S400) of the first embodiment described above with reference to FIG. 14. Specifically, an identification dictionary having the highest detection accuracy is selected from a plurality of kinds of identification dictionaries stored in the identification dictionary storage unit 101 and set as an identification dictionary (candidate identification dictionary) to be a candidate for a new detection identification dictionary.

Then, it is determined whether the candidate identification dictionary has been obtained (S155 of FIG. 18). When the candidate identification dictionary has been obtained (S155: yes), detection identification dictionary selection processing (S500) is started. The contents of the detection identification dictionary selection processing (S500) are similar to those of the detection identification dictionary selection processing (S500) of the first embodiment described above with reference to FIG. 15. Thus, description thereof will be omitted.

When no candidate identification dictionary has not been obtained (S155: no), the detection identification dictionary selection processing (S500) is omitted.

When it is determined that the learned new identification dictionary has not been registered (S154: no), the identification dictionary evaluation processing (S400) and the detection identification dictionary selection processing (S500) are omitted.

Further, when it is determined that no new identification dictionary has been learned (S153: no) in the first place, the learned identification dictionary registration processing (S700), the identification dictionary evaluation processing (S400), and the detection identification dictionary selection processing (S500) are omitted.

Then, it is determined whether the pedestrian detection should be finished (S156). When it is determined that the pedestrian detection should not be finished (S156: no), a return to the start of the processing is made, and a captured image is acquired from the vehicular camera 10 (S150 of FIG. 17). Then, the series of processing steps (S151 to S156) described above is started.

On the other hand, when it is determined that the pedestrian detection should be finished (S156: yes), the pedestrian detection processing of the second embodiment illustrated in FIGS. 17 and 18 is finished.

C-1. Pedestrian Search Processing

Figure 19:
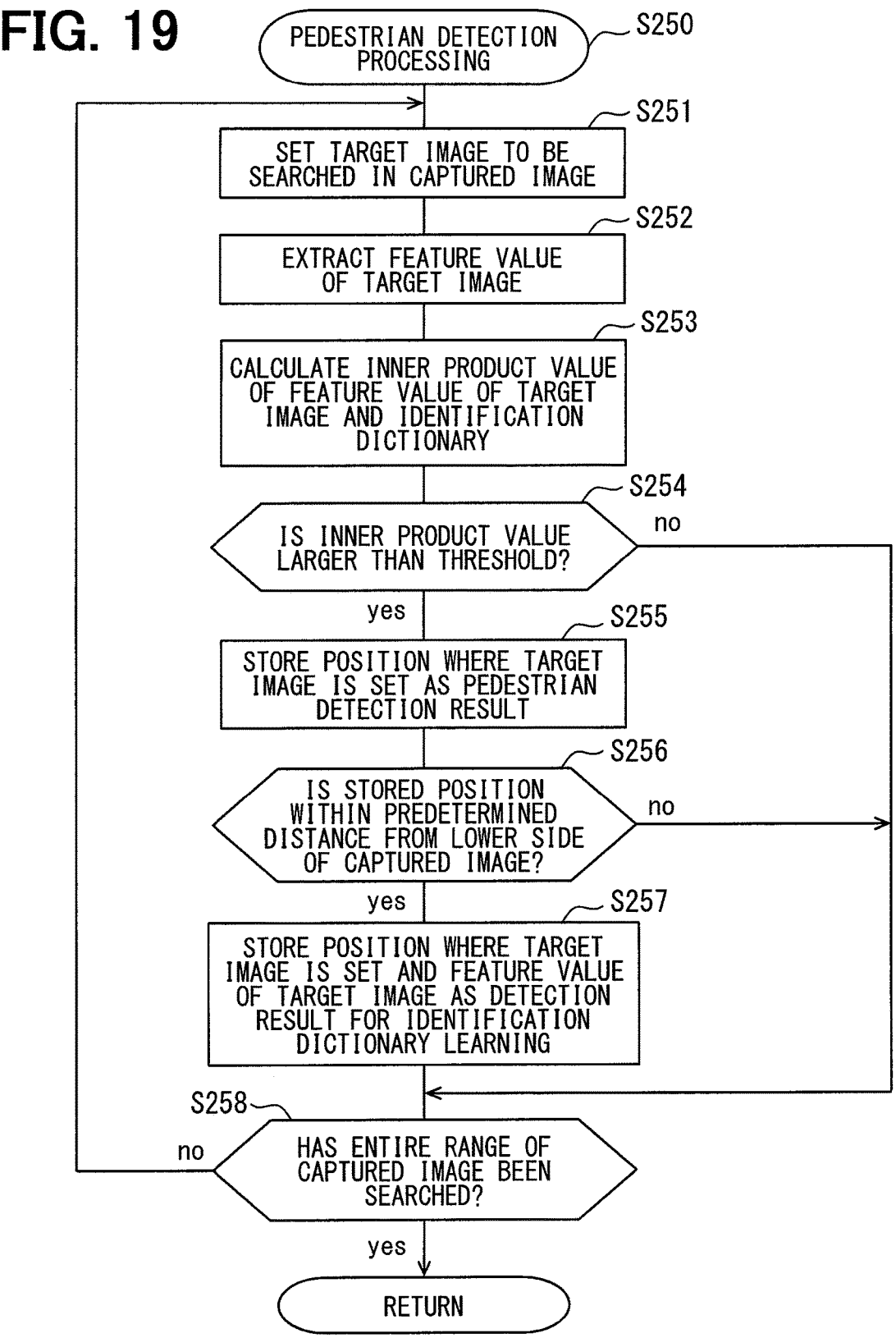
FIG. 19 is a flow chart of pedestrian search processing for performing a search for a pedestrian in the pedestrian detection processing of the second embodiment.

FIG. 19 illustrates a flow chart of the pedestrian search processing (S250) of the second embodiment. As described above, the pedestrian search processing (S250) of the second embodiment differs from the pedestrian search processing of the first embodiment described above with reference to FIG. 10 in that, when a pedestrian is detected, not only the position of the detection (the position where the target image is set), but also the feature values extracted from the target image are stored. Hereinbelow, the pedestrian search processing (S250) of the second embodiment will be briefly described mainly in the different point from the pedestrian search processing (S200) of the first embodiment.

As illustrated, also in the pedestrian search processing of the second embodiment, a target image to be a target for the search of a pedestrian is first set in a captured image (S251), and the feature values of the pedestrian are extracted from the target image (S252).

Then, an inner product value of a coordinate point represented by the feature values of the target image in the feature value space and a coordinate point corresponding to the identification dictionary is calculated (S253), and it is determined whether the obtained inner product value is larger than a predetermined threshold (S254).

When a result of the determination indicates that the inner product value is larger than the threshold (S254: yes), the target image can be determined to include a pedestrian. Thus, the position where the target image is set in the captured image is stored as a pedestrian detection result (S255).

On the other hand, when the inner product value is equal to or smaller than the threshold (S254: no), the target image can be determined to include no pedestrian. Thus, the detection result is not stored.

Then, it is determined whether the position where the pedestrian has been detected in the captured image is within a predetermined distance from the lower side of the captured image (S256). A distance within which the sonars 20 to 23 can detect a pedestrian is limited, and hence a pedestrian present far away cannot be detected. Thus, it is determined whether the pedestrian is present within a distance detectable by the sonars 20 to 23 on the basis of the distance between the lower side of the captured image and the position where the pedestrian has been detected. When a result of the determination indicates that the distance from the lower side of the captured image falls within the predetermined distance (S256: yes), the pedestrian is determined to be detectable by the sonars 20 to 23. Then, the position where the pedestrian has been detected (the position where the target image is set in the captured image) and the feature values extracted from the target image are stored as a detection result for identification dictionary learning (S257).

On the other hand, when the distance from the lower side of the captured image falls out of the predetermined distance (S256: no), a detection result for identification dictionary learning is not stored.

Then, it is determined whether the search for a pedestrian has been performed with target images set throughout the entire range of the captured image (S258). When a result of the determination indicates that a part where the search for a pedestrian has not been performed is left (S258: no), a return to the start of the processing is made, and a search image is set at a new position in the captured image (S251). Then, the following series of processing steps described above (S252 to S258) is started. When it is determined that the search has been performed throughout the entire range of the captured image (S258: yes), the pedestrian search processing of the second embodiment illustrated in FIG. 19 is finished, and a return to the pedestrian detection processing of FIG. 17 is made.

Then, as described above, in the pedestrian detection processing of the second embodiment, when the return from the pedestrian search processing is made, the identification dictionary learning processing (S600) is started.

C-2. Identification Dictionary Learning Processing

Figure 20:
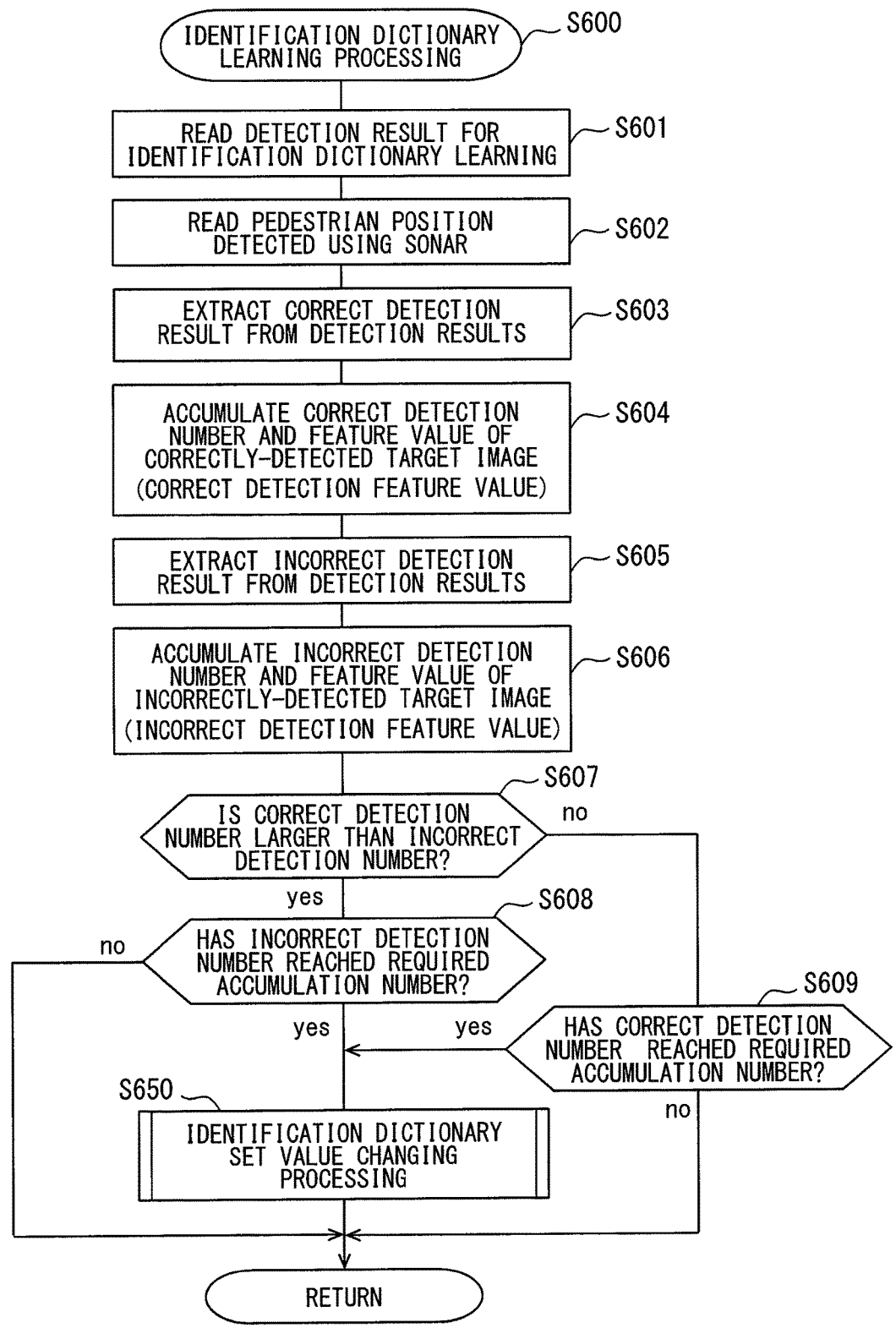
FIG. 20 is a flow chart of identification dictionary learning processing for learning an identification dictionary.

FIG. 20 illustrates a flow chart of the identification dictionary learning processing performed in the pedestrian detection processing of the second embodiment.

As illustrated, in the identification dictionary learning processing (S600), the pedestrian detection result (the position of the target image in which the pedestrian has been detected and the feature values extracted from the target image) stored for identification dictionary learning in the above pedestrian search processing (S250) is read (S601).

Then, the pedestrian position detected using the sonars 20 to 23 is read (S602). Then, similarly to the processing that accumulates the correct detection number in S303 of the detection accuracy calculation processing described above with reference to FIG. 11, a correct detection result is extracted from the detection results for identification dictionary learning (S603), and feature values of the target image of the correct detection (correct detection feature values) are accumulated (S604). Further, similarly to the processing that accumulates the incorrect detection number in S304 of the detection accuracy calculation processing, an incorrect detection result is extracted from the detection results for identification dictionary learning (S605), and feature values of the target image of the incorrect detection (incorrect detection feature values) are accumulated (S606).

For example, in the example illustrated in FIGS. 12 and 13, the feature values extracted from the target image set at the detection position P1 are accumulated as the correct detection feature values, and the feature values extracted from the target image set at the detection position P2 are accumulated as the incorrect detection feature values.

Then, it is determined whether the smaller one of either the correct detection number or the incorrect detection number has reached a required number required for identification dictionary learning. Specifically, it is determined whether the correct detection number is larger than the incorrect detection number (S607). When the correct detection number is larger (S607: yes), it is determined whether the incorrect detection number has reached the required accumulation number (S608). On the other hand, when the incorrect detection number is larger (S607: no), it is determined whether the correct detection number has reached the required accumulation number (S609).

When a result of the determination indicates that the smaller one of either the incorrect detection number or the correct detection number has reached the required accumulation number (S608: yes or S609: yes), processing for changing a set value of the detection identification dictionary (identification dictionary set value changing processing) is started (S650) to generate a new identification dictionary by learning. Although detailed processing contents will be described below, in the identification dictionary set value changing processing (S650), a new identification dictionary is generated using the correct detection feature values accumulated in S603 and the incorrect detection feature values accumulated in S606.

In order to obtain an appropriate identification dictionary by learning, it is desired that a sufficient number of correct detection feature values and a sufficient number of incorrect detection feature values be accumulated. On the other hand, when a time required for the accumulation becomes too long, the environment for capturing an image may change. Thus, the required accumulation number is set to a number within the range of several tens to several thousands (typically, approximately 100).

On the other hand, when the smaller one of either the incorrect detection number or the correct detection number has not reached the required accumulation number (S608: no or S609: no), it is considered that sufficient correct detection feature values and incorrect detection feature values required for learning have not yet been accumulated. Thus, the identification dictionary learning processing of FIG. 20 is finished without starting the identification dictionary set value changing processing (S650), and a return to the pedestrian detection processing of FIG. 17 is made.

As described above, in the pedestrian detection processing, it is determined that no new identification dictionary has been learned (S153 of FIG. 17: no), and it is determined whether the pedestrian detection should be finished (S156 of FIG. 18). When a result of the determination indicates that the pedestrian detection should not be finished (S156: no), the pedestrian detection processing is executed from the start again. In the pedestrian detection processing, the identification dictionary learning processing (S600) is started, the correct detection number and the correct detection feature values are accumulated (S603 of FIG. 20), and the incorrect detection number and the incorrect detection feature values are accumulated (S606).

The smaller one of either the correct detection number or the incorrect detection number reaches the required accumulation number in the end (S608: yes or S609: yes) by repeating such processing. Thus, the following identification dictionary set value changing processing (S650) is started (S650).

C-3. Identification Dictionary Set Value Changing Processing

Figure 21:
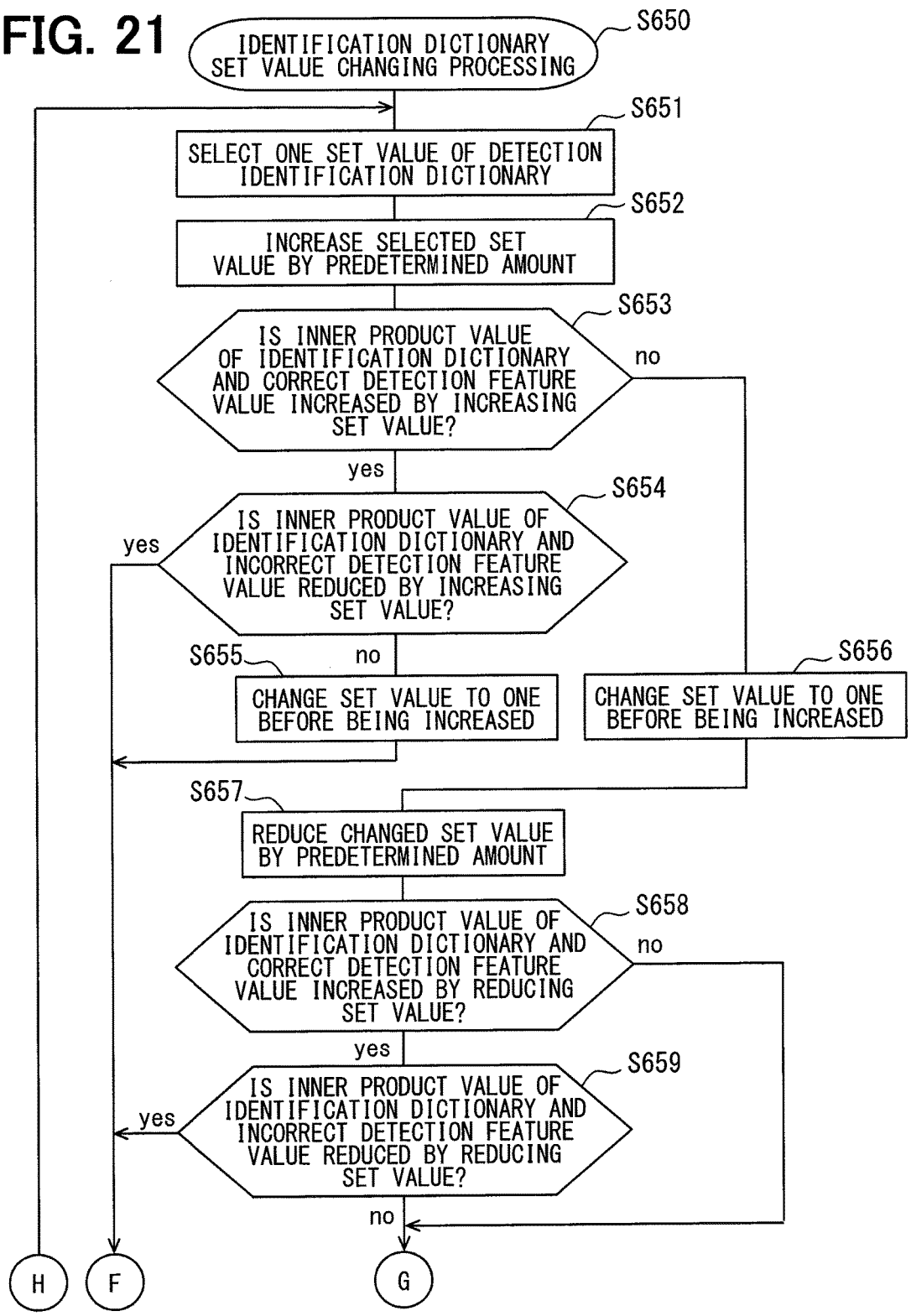
FIG. 21 is a flow chart of the first half of identification dictionary set value changing processing for changing a set value of the identification dictionary in the identification dictionary learning processing.
Figure 22:
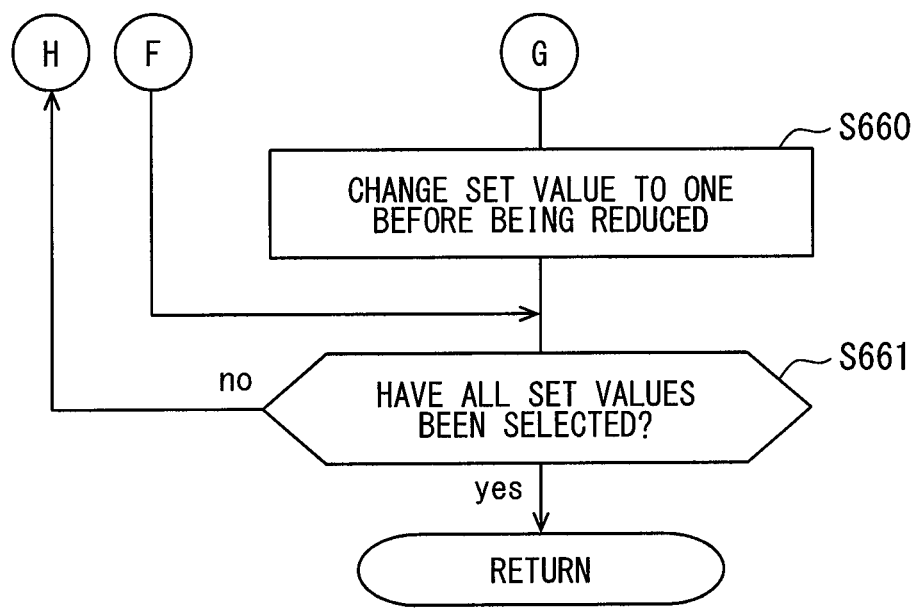
FIG. 22 is a flow chart of the second half of the identification dictionary set value changing processing.

FIGS. 21 and 22 illustrate a flow chart of the identification dictionary set value changing processing (S650).

In the identification dictionary set value changing processing (S650), one feature value (hereinbelow, referred to as a "set value" so as to be distinguished from the feature value of the target image) set in the detection identification dictionary is selected (S651). Since an N-dimensional identification dictionary includes N set values, one of the N set values is selected.

Then, the selected set value is increased by a predetermined amount (S652). As a result, a new identification dictionary having a set value slightly different from that of the detection identification dictionary is generated.

Then, it is determined whether an inner product value with the accumulated correct detection feature value is increased by increasing the selected set value (S653). At this time, it is desired that the inner product values with all the accumulated correct detection feature values be increased. However, even when there are a predetermined ratio or less (10% or less, for example) of correct detection feature values in which the inner product values are not increased, it may be determined that the inner product value with the correct detection feature value is increased.

When it is determined that the inner product value with the correct detection feature value is increased (S653: yes), it is then determined whether the inner product value with the incorrect detection feature value is reduced by increasing the set value (S654). Also in this case, it is desired that the inner product values with all the accumulated incorrect detection feature values be reduced. However, even when there are a predetermined ratio or less (10% or less, for example) of incorrect detection feature values in which the inner product values are not reduced, it may be determined that the inner product value with the incorrect detection feature value is reduced.

As a result, when the inner product value with the correct detection feature value is increased (S653: yes) and the inner product value with the incorrect detection feature value is reduced (S654: yes) by increasing the selected set value, it is determined that the set value should be increased by the predetermined amount, and it is determined whether all the set values of the detection identification dictionary have been selected (S661 of FIG. 22). When a result of the determination indicates that an unselected set value is left (S661: no), a return to the start of the processing is made, and one new set value is selected (S651 of FIG. 21).

On the other hand, when the inner product value with the correct detection feature value is increased (S653: yes), but the inner product value with the incorrect detection feature value is not reduced (S654: no) by increasing the selected set value, it is determined that the set value should neither be increased nor reduced. Thus, the set value is changed to a value before being increased (S655), and it is then determined whether all the set values of the detection identification dictionary have been selected (S661 of FIG. 22).

On the other hand, when the inner product value with the correct detection feature value is not increased (S653: no) by increasing the selected set value, it may be determined that the set value should not be increased, but should be reduced.

Thus, the increased set value is returned to a value before being increased (S656), and the set value is then reduced by a predetermined amount (S657).

Then, it is determined whether the inner product value with the accumulated correct detection feature value is increased by reducing the selected set value (S658). At this time, it is desired that the inner product values with all the accumulated correct detection feature values be increased. However, even when there are a predetermined ratio or less (10% or less, for example) of correct detection feature values in which the inner product values are not increased, it may be determined that the inner product value with the correct detection feature value is increased.

When it is determined that the inner product value with the correct detection feature value is increased by reducing the set value (S658: yes), it is then determined whether the inner product value with the incorrect detection feature value is reduced (S659). Also in this case, it is desired that the inner product values with all the accumulated incorrect detection feature values be reduced. However, even when there are a predetermined ratio or less (10% or less, for example) of incorrect detection feature values in which the inner product values are not reduced, it may be determined that the inner product value with the incorrect detection feature value is reduced.

As a result, when the inner product value with the correct detection feature value is increased (S658: yes) and the inner product value with the incorrect detection feature value is reduced (S659: yes) by reducing the selected set value, it is determined that the set value should be reduced by the predetermined amount, and it is determined whether all the set values of the detection identification dictionary have been selected (S661 of FIG. 22).

On the other hand, when the inner product value with the correct detection feature value is increased (S658: yes), but the inner product value with the incorrect detection feature value is not reduced (S659: no) or when the inner product value with the correct detection feature value is not increased (S658: no), by reducing the selected set value, it can be determined that the set value should neither be increased nor reduced. Thus, the set value is changed to a value before being reduced (S660 of FIG. 22), and it is then determined whether all the set values of the detection identification dictionary have been selected (S661).

When such processing is executed for all the set values of the detection identification dictionary, "yes" is determined in S661. Thus, the identification dictionary set value changing processing illustrated in FIGS. 21 and 22 is finished, and a return to the identification dictionary learning processing of FIG. 20 is made. Thereafter, the identification dictionary learning processing is also finished, and a return to the pedestrian detection processing of the second embodiment illustrated in FIGS. 17 and 18 is made.

As described above, in the pedestrian detection processing of the second embodiment, when the return from the identification dictionary learning processing (S600) is made, it is determined whether a new identification dictionary has been learned (S153 of FIG. 17). When a new identification dictionary has been learned (S153: yes), the learned identification dictionary registration processing (S700) is started.

The new identification dictionary learned by the identification dictionary learning processing corresponds to a "learned identification dictionary".

Figure 23:
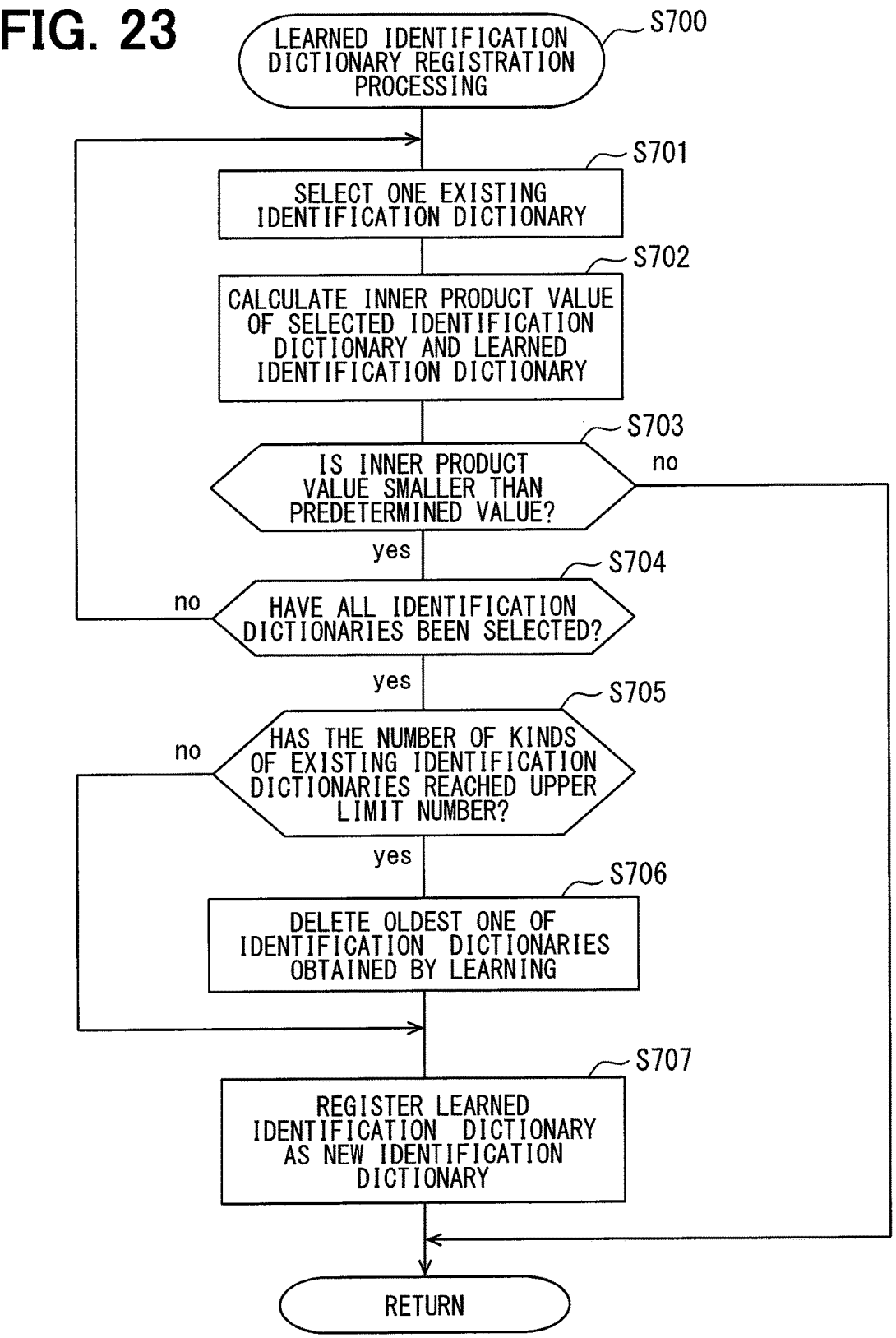
FIG. 23 is a flow chart of learned identification dictionary registration processing for registering an identification dictionary obtained by learning as a new identification dictionary.

C-4. Learned Identification Dictionary Registration Processing:

FIG. 23 illustrates a flow chart of the learned identification dictionary registration processing (S700).

As illustrated, when the learned identification dictionary registration processing (S700) is started, one existing identification dictionary (the identification dictionary registered in the identification dictionary storage unit 101) is first selected (S701). At this time, a detection identification dictionary currently being used may be selected.

Then, an inner product value of the selected identification dictionary and the new identification dictionary obtained by learning is calculated (S702). If the selected identification dictionary and the identification dictionary obtained by learning are completely different identification dictionaries, the inner product value should be small. On the other hand, if the selected identification dictionary and the identification dictionary obtained by learning are similar identification dictionaries, the inner product value should be large.

Thus, when the inner product value is smaller than a predetermined value (S703: yes), it can be considered that the identification dictionary obtained by learning largely differs from the identification dictionary selected in S701. In this case, it is determined whether all the existing identification dictionaries have been selected (S704). When an unselected identification dictionary is left (S704: no), a return to the start is made, and a new identification dictionary is selected (S701). Then, the inner product value with the selected identification dictionary is calculated (S702). When the inner product value is smaller than the predetermined value (S703: yes), the same processing is repeatedly performed on the other identification dictionaries.

During repetition of such processing, it may be determined that the inner product value with any of the identification dictionaries is not small (S703: no). In this case, the identification dictionary obtained by learning is determined to be similar to at least one of the existing identification dictionaries stored in the identification dictionary storage unit 101. Thus, since it is not necessary to register such an identification dictionary as a new identification dictionary, the learned identification dictionary registration processing of FIG. 23 is finished.

On the other hand, when the inner product values with all the identification dictionaries are small (S704: yes), the identification dictionary obtained by learning is not similar to any of the existing identification dictionaries stored in the identification dictionary storage unit 101. Thus, the identification dictionary obtained by learning is determined to be worth registering as a new identification dictionary.

When an identification dictionary that is not similar to the existing identification dictionaries is registered every time the identification dictionary is obtained, the number of kinds of identification dictionaries stored in the identification dictionary storage unit 101 may become too large. When the number of kinds of the stored identification dictionaries is too large, not only a large memory capacity is required, but also rapid detection of a pedestrian becomes difficult because, in the pedestrian detection processing described with reference to FIGS. 17 and 18, it takes long time to perform the identification dictionary evaluation processing (S400) for evaluating a plurality of identification dictionaries stored in the identification dictionary storage unit 101.

When the number of identification dictionaries stored in the identification dictionary storage unit 101 increases and a new identification dictionary is learned, a time required for processing for determining whether the new identification dictionary is worth registering (S701 to S704 of FIG. 23) also increases.

Thus, when it is determined that the new identification dictionary obtained by learning has a small inner product value with all the existing identification dictionaries (is worth registering as a new identification dictionary) (S704: yes), it is determined whether the number of kinds of existing identification dictionaries stored in the identification dictionary storage unit 101 has reached a predetermined upper limit number (S705).

When a result of the determination indicates that the number of kinds of existing identification dictionaries has reached the upper limit number (S705: yes), it can be determined that the number of kinds of identification dictionaries stored in the identification dictionary storage unit 101 is too large. In this case, the oldest identification dictionary obtained by learning is deleted from the identification dictionaries stored in the identification dictionary storage unit 101 (S706). When there is a standard identification dictionary that has not been registered by learning, but previously stored in the identification dictionary storage unit 101, the oldest identification dictionary except the standard identification dictionary is deleted.

Then, after the number of kinds of identification dictionaries stored in the identification dictionary storage unit 101 is reduced by one, the identification dictionary obtained by learning is stored in the identification dictionary storage unit 101 so as to be registered as a new identification dictionary (S707).

Accordingly, it is possible to store the newest identification dictionary corresponding to a change in the environment of image capturing by the vehicular camera 10 while reducing the number of kinds of identification dictionaries stored in the identification dictionary storage unit 101 to the upper limit number. In an identification dictionary learned at an old timing, an environment in which the identification dictionary has been learned may largely differ from the current environment, and the identification dictionary is highly likely to have a reduced detection accuracy. Thus, there is no problem to delete such an identification dictionary.

Of course, the current environment may vary and approach the environment in which the deleted identification dictionary has been learned. However, even in such a case, since the identification dictionary can be learned according to the environmental change, there is a tiny problem caused by deleting the identification dictionary learned at the oldest timing.

In the identification dictionary learned at the oldest timing, the environment in which the dictionary has been learned largely differs from the current environment. Thus, it can be considered that the detection accuracy is also largely reduced. Thus, in S706 of FIG. 23, an identification dictionary having the lowest detection accuracy among the learned and registered identification dictionaries may be deleted instead of the identification dictionary learned at the oldest timing. The detection accuracy of the identification dictionary may again be calculated, or a detection accuracy calculated in the identification dictionary evaluation processing (S400) as described above with reference to FIG. 14 may be used.

Here, a new identification dictionary is stored (S707) after the identification dictionary stored in the identification dictionary storage unit 101 is deleted (S706). However, the identification dictionary stored in the identification dictionary storage unit 101 may be deleted (S706) after a new identification dictionary is stored in the identification dictionary storage unit 101 (S707).

On the other hand, when the number of kinds of the existing identification dictionaries stored in the identification dictionary storage unit 101 has not reached the upper limit number (S705: no), an identification dictionary obtained by learning is added to and stored in the identification dictionary storage unit 101 so as to be registered as a new identification dictionary (S707).

After the identification dictionary obtained by learning is registered in the identification dictionary storage unit 101 in this manner (S707), the learned identification dictionary registration processing of FIG. 23 is finished.

Figure 24A:
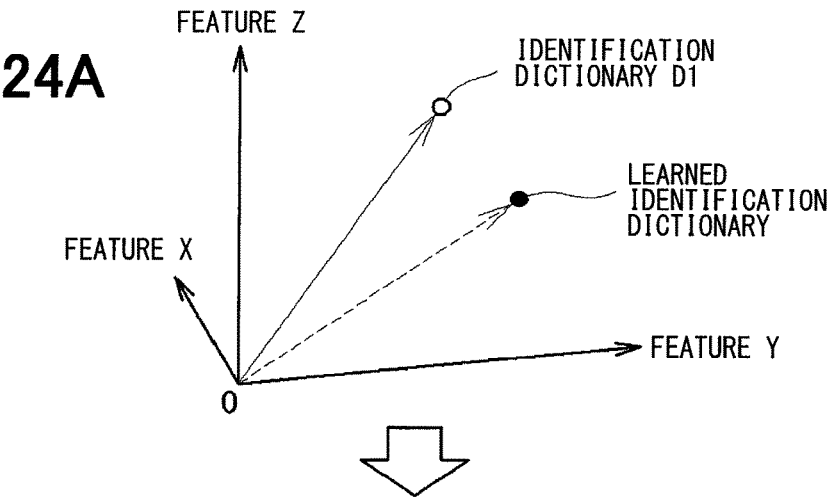
FIGS. 24A to 24C are explanatory diagrams illustrating a state in which a new identification dictionary is added in the learned identification dictionary registration processing.
Figure 24B:
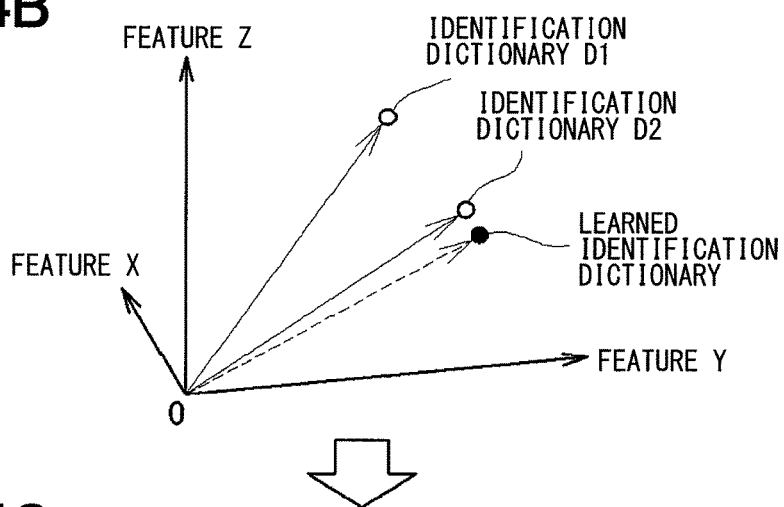
Figure 24C:
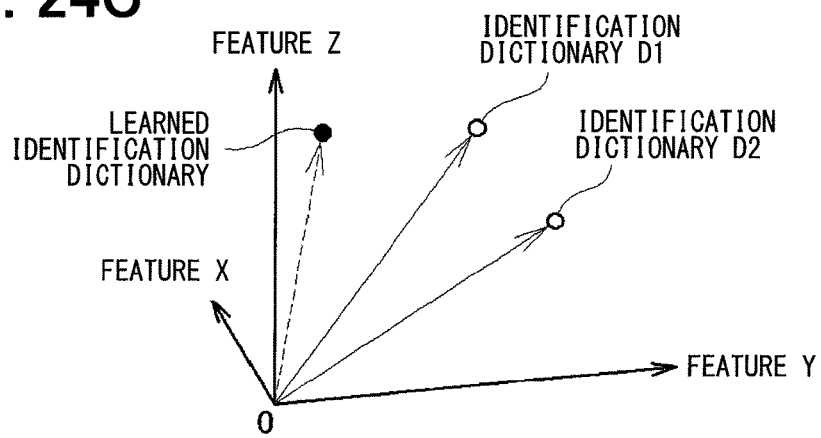

FIGS. 24A to 24C conceptually illustrate a state in which an identification dictionary is registered by the learned identification dictionary registration processing (S700) described above.

For example, as illustrated in FIG. 24A, one identification dictionary (identification dictionary D1) is stored in the identification dictionary storage unit 101, and an identification dictionary indicated by a black circle in FIG. 24A is learned. In this case, an inner product value of the learned identification dictionary and the existing identification dictionary D1 is small. Thus, the learned identification dictionary is added to the identification dictionary storage unit 101 as a new identification dictionary D2.

Then, as illustrated in FIG. 24B, an identification dictionary indicated by a black circle in FIG. 24B is learned with the identification dictionary D1 and the identification dictionary D2 stored. In this case, in the learned identification dictionary, an inner product value with the identification dictionary D1 is small, but an inner product value with the identification dictionary D2 is not small. Thus, the learned identification dictionary is not added to the identification dictionary storage unit 101.

Further, as illustrated in FIG. 24C, another identification dictionary indicated by a black circle in FIG. 24C is learned with the identification dictionary D1 and the identification dictionary D2 stored. In the learned identification dictionary, both an inner product value with the identification dictionary D1 and an inner product value with the identification dictionary D2 are small. Thus, the learned identification dictionary is added to the identification dictionary storage unit 101 as a new identification dictionary.

In this manner, in the learned identification dictionary registration processing (S700) illustrated in FIG. 23, when a new identification dictionary is learned in the identification dictionary learning processing (S600), it is determined whether the learned identification dictionary is similar to the existing identification dictionary (whether the inner product value is smaller than the predetermined value). When the identification dictionary is not similar to the existing identification dictionary, the identification dictionary is registered as a new identification dictionary. As a result, in the pedestrian detection processing of the second embodiment, every time a new identification dictionary that is not similar to the existing identification dictionary is learned in the identification dictionary learning processing (S600), the number of identification dictionaries stored in the identification dictionary storage unit 101 increases.

In this manner, when the learned identification dictionary registration processing (S700) of FIG. 23 is finished, a return to the pedestrian detection processing of the second embodiment is made.

Then, as described above with reference to FIGS. 17 and 18, it is determined whether a new identification dictionary has been registered (S154 of FIG. 17). When a new identification dictionary has been registered (S154: yes), the identification dictionary evaluation processing (S400) describe above is started. When a candidate identification dictionary has been obtained in the identification dictionary evaluation processing (S400) (S155 of FIG. 18: yes), the detection identification dictionary selection processing (S500) is started.

When the detection identification dictionary selection processing (S500) is finished, it is determined whether the pedestrian detection should be finished (S156). When the pedestrian detection should not be finished (S156: no), a return to the start of the pedestrian detection processing of the second embodiment is made, and a new captured image is acquired from the vehicular camera 10 (S150 of FIG. 17). Thereafter, the following series of processing steps described above is started.

On the other hand, when it is determined that the pedestrian detection should be finished (S156: yes), the pedestrian detection processing of the second embodiment illustrated in FIGS. 17 and 18 is finished.

In the pedestrian detection processing of the second embodiment described above, it is possible to learn an identification dictionary according to a change in the environment in which an image is captured and increase the number of kinds of identification dictionaries. Thus, even when the environment variously changes, it is possible to detect a pedestrian in a captured image with high accuracy.

Figure 25:
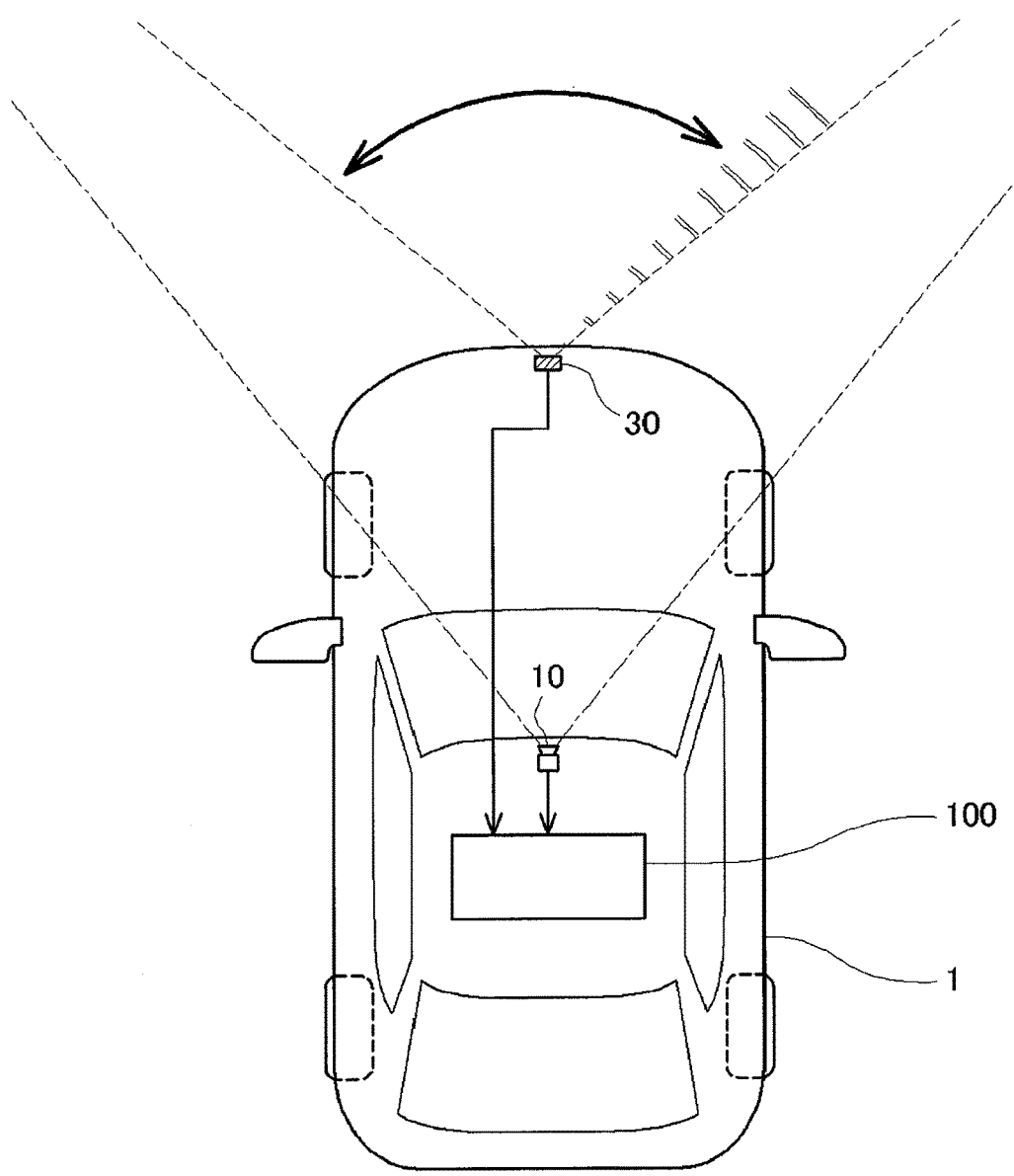
FIG. 25 is an explanatory diagram illustrating, as an example, a vehicle 1 of a modification equipped with a radar instead of the sonars.

For example, in the above various embodiments, the sonars 20 to 23 are used to detect a pedestrian position. Alternatively, as illustrated in FIG. 25, a radar 30 may be used instead of the sonars 20 to 23 to detect a pedestrian position.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A pedestrian detection device mounted on a vehicle having a vehicular camera and at least one of a sonar and a radar, and analyzing a captured image captured by the vehicular camera to detect a pedestrian in the captured image, the pedestrian detection device comprising:
    an identification dictionary storage unit that, using a processor, stores a plurality of kinds of identification dictionaries having different numerical values obtained by converting a plurality of features of a shape of a pedestrian in a previously captured image into a numerical form;
    a detection result accumulation unit that, using the processor, searches the plurality of kinds of identification dictionaries stored in the identification dictionary storage unit for a part of the captured image having one of the features described in the identification dictionaries to detect the pedestrian in the captured image, and accumulates a detection position, where the pedestrian is detected, as a detection result for each of the identification dictionaries;
    a pedestrian position accumulation unit that, using the processor, detects the pedestrian disposed around the vehicle using at least one of the sonar and the radar, and accumulates a pedestrian position where the pedestrian is detected;
    an identification dictionary selection unit that, using the processor, compares the pedestrian position accumulated in the pedestrian position accumulation unit with the detection position of the pedestrian accumulated as the detection result for each of the identification dictionaries in the detection result accumulation unit, and selects one of the identification dictionaries having the detection result consistent with the pedestrian position as a detection identification dictionary;
    a pedestrian detection unit that, using the processor, searches for a part of the captured image having one of the features described in the detection identification dictionary, and detects the pedestrian in the captured image;
    a detection accuracy evaluation unit that, using the processor, accumulates the detection position of the pedestrian obtained by the detection identification dictionary and the pedestrian position detected using at least one of the sonar and the radar, and evaluates a detection accuracy of the detection identification dictionary; and
    a reselection necessity determination unit that, using the processor, determines a necessity of reselection of the detection identification dictionary based on an evaluation result obtained by the detection accuracy evaluation unit, wherein:
    the detection result accumulation unit accumulates the detection result for each of the identification dictionaries when the reselection necessity determination unit determines that reselection of the detection identification dictionary is necessary.

2. The pedestrian detection device according to claim 1, wherein:
    the detection result accumulation unit acquires information about a distance between the vehicle and the pedestrian based on the pedestrian position where the pedestrian is detected in the captured image, and accumulates the detection position of the pedestrian as the detection result of the pedestrian when the distance to the pedestrian falls within a threshold distance.

3. The pedestrian detection device according to claim 1, wherein:
    the pedestrian detection unit includes:
        a feature value extraction unit that converts a target image, shown in a part of the captured image to be searched, into a numerical form with respect to the plurality of features of the shape of the pedestrian to extract a plurality of feature values from the target image; and
        an inner product value calculation unit that calculates an inner product value between the plurality of numerical values described in each of the identification dictionaries and the plurality of feature values extracted from the target image; and
    the pedestrian detection unit detects the pedestrian by determining that the target image includes the pedestrian when the inner product value obtained by the inner product value calculation unit exceeds a predetermined threshold.

4. The pedestrian detection device according to claim 3 further comprising:
a detection result confirmation unit that confirms, using the processor and at least one of the sonar and the radar, whether the detection result of the pedestrian obtained by the pedestrian detection unit is correct or incorrect;
a correct detection feature value accumulation unit that, using the processor, accumulates, as correct detection feature values, the feature values obtained from the target image in which the pedestrian is detected when the pedestrian is detected by the pedestrian detection unit and the detection result confirmation unit determines that the detection result is correct;
an incorrect detection feature value accumulation unit that, using the processor, accumulates, as incorrect detection feature values, the feature values obtained from the target image in which the pedestrian is detected when the pedestrian is detected by the pedestrian detection unit and the detection result confirmation unit determines that the detection result is incorrect;
a learned identification dictionary generation unit that, using the processor, generates a learned identification dictionary by learning the plurality of numerical values of the detection identification dictionary so as to increase the inner product value obtained by the inner product value calculation unit with respect to the correct detection feature values and to reduce the inner product value obtained by the inner product value calculation unit with respect to the incorrect detection feature values; and
a learned identification dictionary addition unit that, using the processor, adds the learned identification dictionary to the identification dictionary storage unit as the identification dictionary.

5. The pedestrian detection device according to claim 4 further comprising:
an identification dictionary deleting unit that, using the processor, determines whether the number of kinds of the identification dictionaries stored in the identification dictionary storage unit reaches a predetermined upper limit number, and deletes a learned identification dictionary added at an oldest timing by the learned identification dictionary addition unit from the learned identification dictionaries stored in the identification dictionary storage unit when the number of kinds of the identification dictionaries reaches the upper limit number.

6. A pedestrian detection method applied to a vehicle having a vehicular camera and at least one of a sonar and a radar, and analyzing a captured image captured by the vehicular camera to detect a pedestrian included in the captured image, the pedestrian detection method comprising:
searching a plurality of kinds of identification dictionaries, described by converting a plurality of features of a shape of a pedestrian in a previously captured image into a numerical form, for a part of the captured image having one of the features described in the identification dictionaries to detect the pedestrian in the captured image; and accumulating a detection position, where the pedestrian is detected, as a detection result for each of the identification dictionaries;
detecting the pedestrian disposed around the vehicle using at least one of the sonar and the radar; and accumulating a pedestrian position where the pedestrian is detected;
comparing the pedestrian position accumulated in the accumulating of the pedestrian position with the detection position of the pedestrian accumulated as the detection result for each of the identification dictionaries in the accumulating of the detection result; and selecting one of the identification dictionaries having the detection result consistent with the pedestrian position as a detection identification dictionary;
searching for a part of the captured image having one of the features described in the detection identification dictionary to detect the pedestrian in the captured image;
accumulating the detection position of the pedestrian obtained by the detection identification dictionary and the pedestrian position detected using at least one of the sonar and the radar, and evaluating a detection accuracy of the detection identification dictionary;
determining a necessity of reselection of the detection identification dictionary based on an evaluation result obtained in the evaluating of the detection accuracy; and
accumulating the detection position for each of the identification dictionaries when determining that reselection of the detection identification dictionary is necessary.

7. A pedestrian detection device mounted on a vehicle having a vehicular camera and at least one of a sonar and a radar, and analyzing a captured image captured by the vehicular camera to detect a pedestrian in the captured image, the pedestrian detection device comprising:
an identification dictionary storage unit that, using a processor, stores a plurality of kinds of identification dictionaries having different numerical values obtained by converting a plurality of features of a shape of a pedestrian in a previously captured image into a numerical form;
a detection result accumulation unit that, using the processor, searches the plurality of kinds of identification dictionaries stored in the identification dictionary storage unit for a part of the captured image having one of the features described in the identification dictionaries to detect the pedestrian in the captured image, and accumulates a detection position, where the pedestrian is detected, as a detection result for each of the identification dictionaries;
a pedestrian position accumulation unit that, using the processor, detects the pedestrian disposed around the vehicle using at least one of the sonar and the radar, and accumulates a pedestrian position where the pedestrian is detected;
an identification dictionary selection unit that, using the processor, compares the pedestrian position accumulated in the pedestrian position accumulation unit with the detection position of the pedestrian as the detection result for each of the identification dictionaries in the detection result accumulation unit, and selects one of the identification dictionaries having the detection result consistent with the pedestrian position as a detection identification dictionary;
a pedestrian detection unit that, using the processor, searches for a part of the captured image having one of the features described in the detection identification dictionary, and detects the pedestrian in the captured image; and a detection accuracy evaluation unit that, using the processor, accumulates the detection position of the pedestrian obtained by the detection identification dictionary and the pedestrian position detected using at least one of the sonar and the radar, and evaluates a detection accuracy of the detection identification dictionary, wherein:

the identification dictionary selection unit selects the detection identification dictionary based on the detection accuracy.

8. A pedestrian detection method applied to a vehicle having a vehicular camera and at least one of a sonar and a radar, and analyzing a captured image captured by the vehicular camera to detect a pedestrian included in the captured image, the pedestrian detection method comprising:

searching a plurality of kinds of identification dictionaries, described by converting a plurality of features of a shape of the pedestrian in the captured image into a numerical form, for a part of the captured image having one of the features described in the identification dictionaries to detect the pedestrian in the captured image; and accumulating a detection position, where the pedestrian is detected, as a detection result for each of the identification dictionaries;

detecting the pedestrian disposed around the vehicle using at least one of the sonar and the radar; and accumulating a pedestrian position where the pedestrian is detected;

comparing the pedestrian position accumulated in the accumulating of the pedestrian position with the detection position of the pedestrian as the detection result for each of the identification dictionaries in the accumulating of the detection result; and selecting one of the identification dictionaries having the detection result consistent with the pedestrian position as a detection identification dictionary;

searching for a part of the captured image having one of the features described in the detection identification dictionary to detect the pedestrian in the captured image; and accumulating the detection position of the pedestrian obtained by the detection identification dictionary and the pedestrian position detected using at least one of the sonar and the radar, and evaluating a detection accuracy of the detection identification dictionary, wherein:

the selecting of the detection identification dictionary is performed based on the detection accuracy.

* * * * *